(12) United States Patent
Sasaki et al.

(10) Patent No.: US 8,248,894 B2
(45) Date of Patent: Aug. 21, 2012

(54) THERMALLY-ASSISTED MAGNETIC RECORDING HEAD HAVING HEAT RADIATION LAYER AND INTERPOSED LAYER

(75) Inventors: Yoshitaka Sasaki, Milpitas, CA (US);
Hiroyuki Ito, Milpitas, CA (US);
Atsushi Iijima, Hong Kong (CN)

(73) Assignees: Headway Technologies, Inc., Milpitas, CA (US); TDK Corporation, Tokyo (JP)

( * ) Notice: Subject to any disclaimer, the term of this patent is extended or adjusted under 35 U.S.C. 154(b) by 303 days.

(21) Appl. No.: 12/654,879

(22) Filed: Jan. 7, 2010

(65) Prior Publication Data
US 2011/0164333 A1    Jul. 7, 2011

(51) Int. Cl.
*G11B 11/00*    (2006.01)
(52) U.S. Cl. .................. 369/13.33; 369/13.13
(58) Field of Classification Search ............. 369/13.33, 369/13.13, 13.32, 13.02, 112.09, 112.14, 369/112.21, 112.27; 360/59; 385/129, 31, 385/88–94; 29/603.02–603.27; 250/201.3, 250/201.5
See application file for complete search history.

(56) References Cited

U.S. PATENT DOCUMENTS

| | | | |
|---|---|---|---|
| 7,791,839 B2 * | 9/2010 | Olson et al. | 360/125.31 |
| 2009/0073597 A1 * | 3/2009 | Shiramatsu et al. | 360/59 |
| 2011/0128828 A1 * | 6/2011 | Naniwa et al. | 369/13.23 |

FOREIGN PATENT DOCUMENTS

| | | |
|---|---|---|
| JP | A-2005-4901 | 1/2005 |
| JP | A-2007-164935 | 6/2007 |
| JP | A-2007-257753 | 10/2007 |
| JP | 2008-A-257819 | 10/2008 |
| JP | 2009-A-059417 | 3/2009 |
| JP | 2009-A-140607 | 6/2009 |
| JP | A-2009-272030 | 11/2009 |

* cited by examiner

*Primary Examiner* — Tan X Dinh
(74) *Attorney, Agent, or Firm* — Oliff & Berridge, PLC

(57) ABSTRACT

A thermally assisted magnetic head includes a main magnetic pole layer, a near-field light generating layer having a generating end part generating near-field light arranged within a medium-opposing surface, and an optical waveguide guiding light to the near-field light generating layer. The near-field light generating layer has a near-field light generating part in a triangle shape with the generating end part being one vertex, and is formed in a triangle pole shape. The optical waveguide is formed to be opposed to a ridge part of the near-field light generating layer via an interposed layer. The main magnetic pole layer is formed to be opposed to the generating end part via the interposed layer. The thermally assisted magnetic head further includes a heat radiating layer in contact with an opposite side of the near-field light generating layer from the optical waveguide.

18 Claims, 21 Drawing Sheets

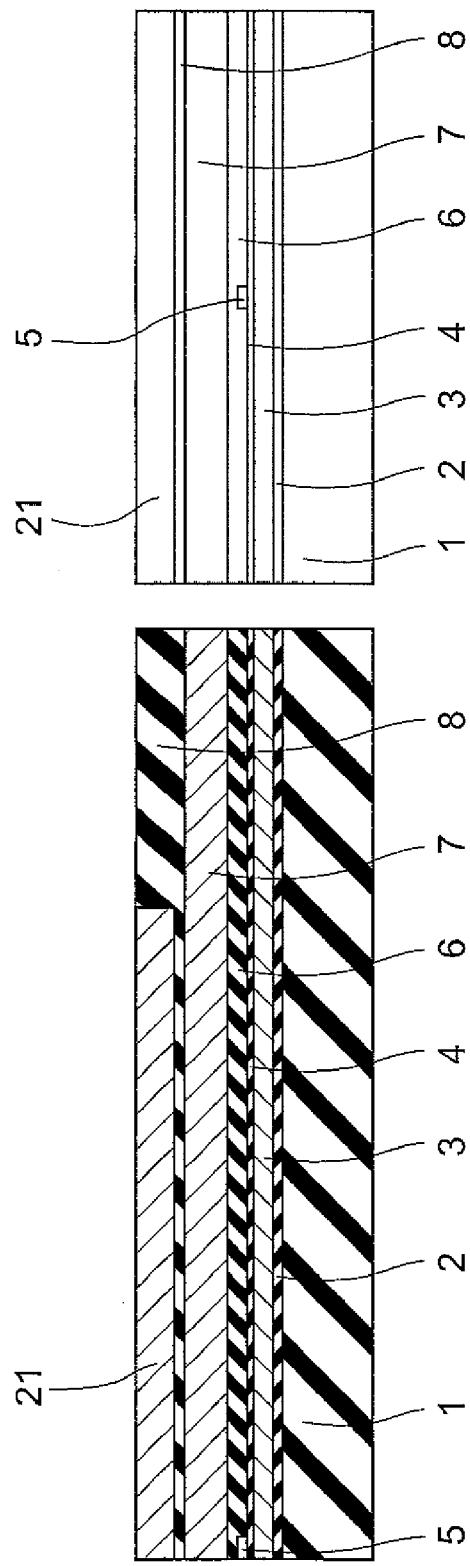

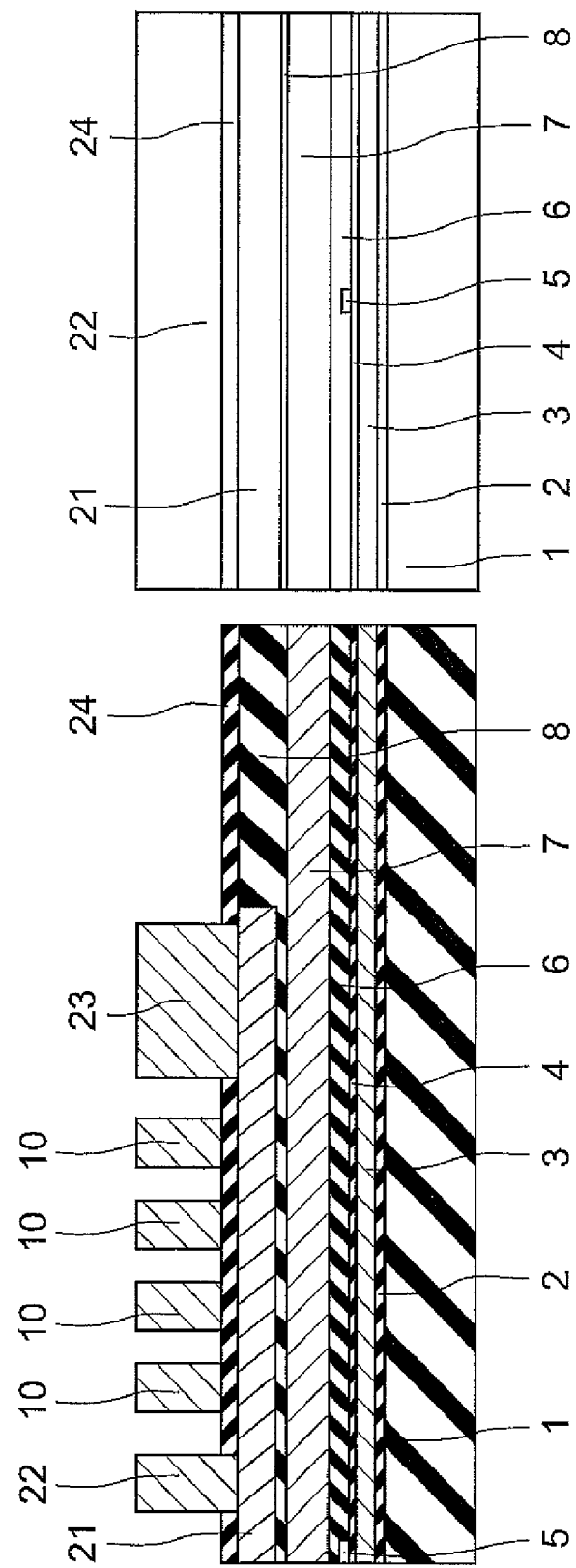

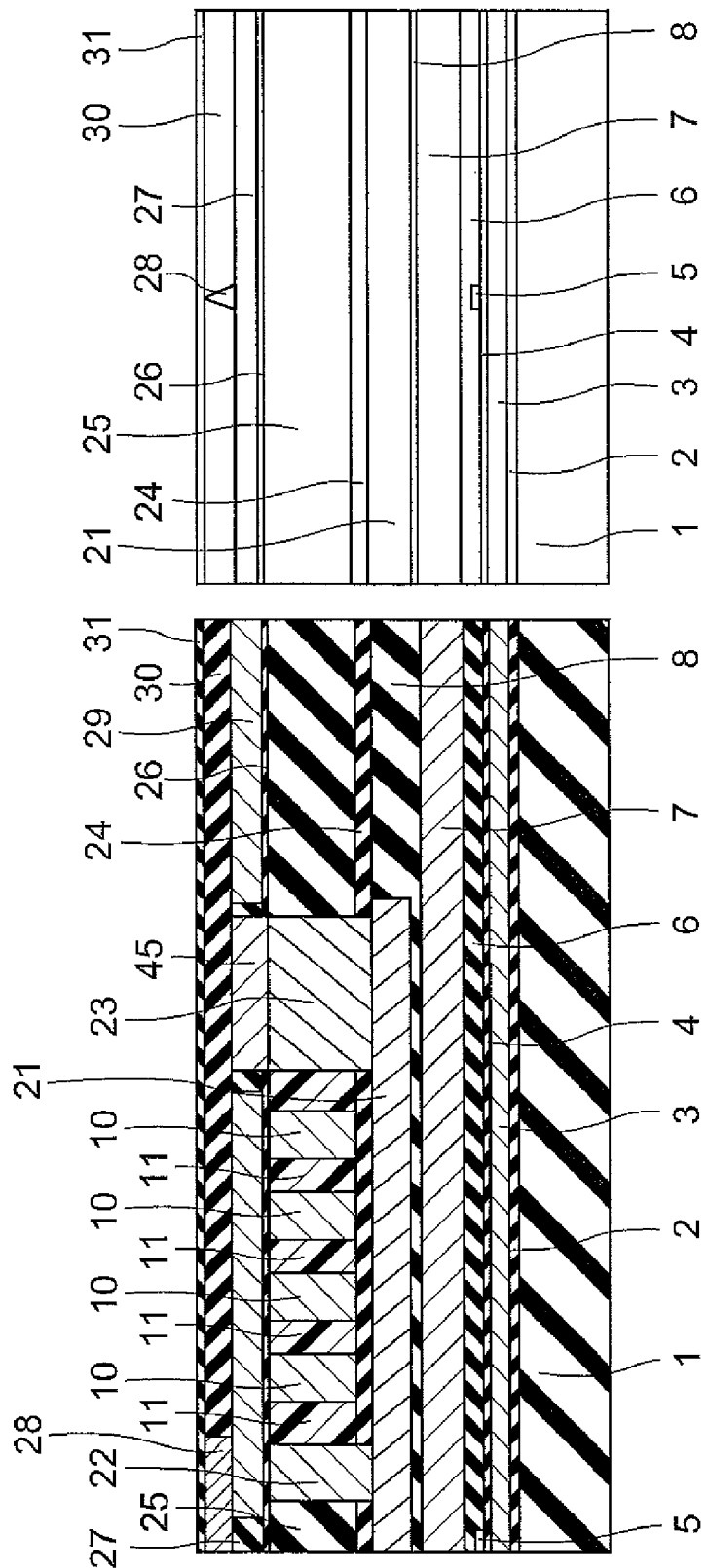

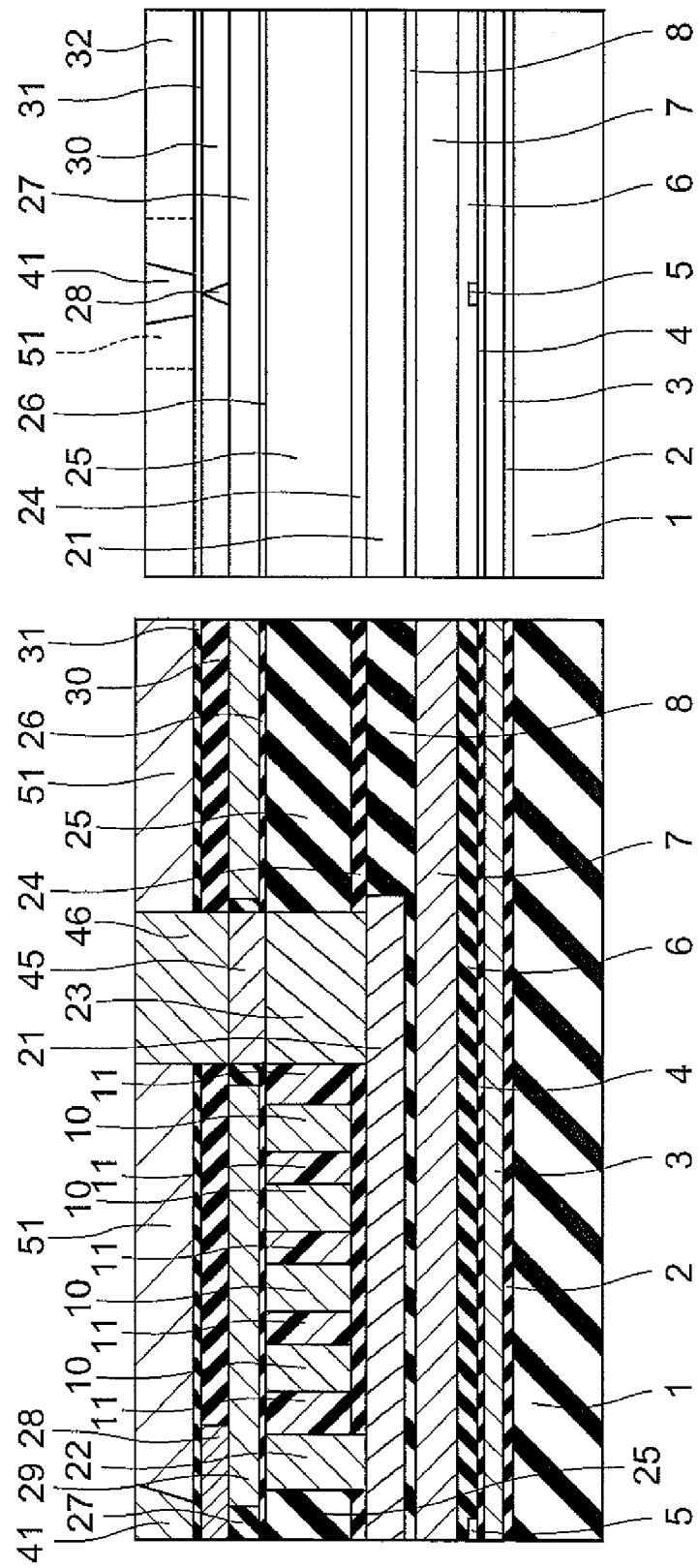

THERMALLY-ASSISTED MAGNETIC RECORDING HEAD HAVING HEAT RADIATION LAYER AND INTERPOSED LAYER

BACKGROUND

1. Field of the Invention

The present invention relates to a thermally assisted magnetic head recording data on a magnetic recording medium by thermally assisted magnetic recording using near-field light and a method of manufacturing the same, and a head gimbal assembly and a hard disk drive each having a thermally assisted magnetic head.

2. Related Background Art

In recent years, as hard disk drives have been increasing their recording densities, thin-film magnetic heads recording data on magnetic recording media have been required to further improve their performances. As the thin-film magnetic heads, those of composite type having a structure in which a reproducing head having a magnetoresistive device (hereinafter, referred to also as an "MR device") for read and a recording head having an electromagnetic coil device for write are laminated have been conventionally in wide use. In a magnetic disk drive, the thin-film magnetic head is provided on a slider which very slightly floats from the magnetic recording medium.

Incidentally, the magnetic disk drive records data by magnetizing magnetic fine particles on the magnetic recording medium using the recording head. In order to increase the recording density of the magnetic recording medium, it is effective to make the magnetic fine particles smaller.

When the magnetic fine particles are made smaller, however, there arises a problem that the magnetization thereof becomes unstable with respect to heat as the particles reduce in volume, thereby increasing the possibility that the data recorded on the magnetic recording medium is lost. To solve the problem, it is effective to increase the magnetic energy of the magnetic fine particles to thereby enhance the stability of magnetization. When the magnetic energy of the magnetic fine particles is increased, however, there arises another problem that the coercive force (difficulty in reversing magnetization) of the magnetic recording medium increases to deteriorate the data recording performance.

To solve such problems, a method called thermally assisted magnetic recording has been conventionally proposed. When recording data on a magnetic recording medium having a large coercive force, the thin-film magnetic head employing the thermally assisted magnetic recording (hereinafter, referred to as a "thermally assisted magnetic head") records data while instantaneously heating and thereby increasing the temperature of a portion of the magnetic recording medium where data will be recorded.

Since the magnetic fine particles decrease in coercive force when the temperature is increased, instantaneous heating makes it possible to record data even on the magnetic recording medium having a high coercive force at room temperature. The portion of the magnetic recording medium where the data has been recorded is decreased in temperature after the recording of data and thereby increases in coercive force. Therefore, by using the thermally assisted magnetic head, it becomes possible to make the magnetic fine particles finer as well as stabilize recording in the magnetic disk drive.

On the other hand, near-field light is used as means for heating the magnetic recording medium in the conventional thermally assisted magnetic head. When light enters an opening smaller than the wavelength of light, the light slightly seeps from the opening and locally exists near the opening. The light locally existing near the opening is called near-field light. The near-field light is confined in a region much smaller than that of a spot light obtained by collecting light using a lens, so that use of the near-field light makes it possible to heat only a limited extremely small recording region of the magnetic recording medium.

Known as a method of generating the near-field light in the conventional thermally assisted magnetic head is a method using a plasmon antenna (also called a plasmon probe) that is a minute metal piece. In this method, the near-field light is generated by guiding laser light to the plasmon antenna via an optical waveguide.

As a conventional plasmon antenna, a light scattering body made of metal such as gold, palladium or the like in a triangular thin plate structure is disclosed in Japanese Patent Application Laid-Open No. 2005-4901, for example. Further, a plasmon probe made of metal such as gold, silver, aluminum or the like in the shape of a triangle pole is disclosed in Japanese Patent Application Laid-Open No. 2007-257753. Furthermore, a near-field light generating part in an isosceles triangle including a tip end reaching a medium-opposing surface is disclosed in Japanese Patent Application Laid-Open No. 2007-164935.

SUMMARY OF THE INVENTION

As described above, in the conventional thermally assisted magnetic head, the laser light are guided to the plasmon antenna to excite surface plasmons to generate the near-field light based on the surface plasmons. This near-field light is used as means for heating the magnetic recording medium.

The plasmon antenna, however, generates heat in itself accompanying the generation of the near-field light. In addition, the plasmon antenna has a very small size and made of metal such as gold, silver, aluminum, palladium or the like and thus causes self expansion due to its own heat generation. Then, since the thermally assisted magnetic head has a medium-opposing surface opposing the magnetic recording medium and the plasmon antenna has a tip end portion reaching the medium-opposing surface, the tip end portion projects to approach from the medium-opposing surface to the magnetic recording medium. Thus, the conventional thermally assisted magnetic head has a problem that the medium-opposing surface is likely to project and collide with the magnetic recording medium due to the magnetic recording action. Further, when the plasmon antenna increases in temperature due to the self heat generation, it may melt. Then, the shape of the plasmon antenna is deformed to make it difficult to intensively heat the extremely small recording region of the magnetic recording medium.

To increase the recording density in a magnetic recording apparatus, a smaller spot diameter of the near-field light is more preferable. To generate the near-field light having a small spot diameter and sufficient intensity, it is effective to concentrate more surface plasmons to the tip end portion of the plasmon antenna. In such a configuration, however, there is another problem that though near-field light having a high electric field intensity is generated from the tip end portion, the generated heat also increases to cause the tip end portion to be more likely to project from the medium-opposing surface and melt.

The present invention is made to solve the above problems, and it is an object to provide a thermally assisted magnetic head having a structure for preventing failure of a hard disk drive due to projection of a medium-opposing surface accompanying a magnetic recording action and preventing melting of a plasmon antenna and a method of manufacturing the same, and a head gimbal assembly and a hard disk drive each including the thermally assisted magnetic head.

To solve the above problems, the present invention is a thermally assisted magnetic head including a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, wherein the near-field light generating layer has a near-field light generating part in a triangle shape with the generating end part being one vertex, and is formed in a triangle pole shape extending from the medium-opposing surface in a depth direction intersecting with the medium-opposing surface, wherein the optical waveguide is formed to be opposed to a ridge part of the near-field light generating layer via an interposed layer, the ridge part extending from the generating end part in the depth direction, wherein the magnetic pole end face of the main magnetic pole layer is formed to be opposed to the generating end part via the interposed layer, on a side closer to the medium-opposing surface than is the optical waveguide, and wherein the thermally assisted magnetic head includes a heat radiating layer in contact with an opposite side of the near-field light generating layer from the optical waveguide.

In the thermally assisted magnetic head, the optical waveguide is opposed to the ridge part of the near-field light generating layer via the interposed layer, and the magnetic pole end face of the main magnetic pole layer is also opposed to the generating end part via the interposed layer. Therefore, the thermally assisted magnetic head is structured such that both the optical waveguide and the main magnetic pole layer are arranged very close to the generating end part while keeping the same minute distance with respect to the generating end part according to the very thin interposed layer. In addition, the heat generated by the near-field light generating layer is conducted to the heat radiating layer and radiated from the heat radiating layer to the outside of the near-field light generating layer.

Preferably, in the thermally assisted magnetic head, the heat radiating layer is arranged at a position distant from the medium-opposing surface, and the thermally assisted magnetic head further includes a protective insulating layer arranged between the heat radiating layer and the medium-opposing surface.

The case where the thermally assisted magnetic head has such a protective insulating layer eliminates the possibility that the heat radiating layer may project from the medium-Opposing surface when polishing for forming the medium-opposing surface is performed.

Further, it is preferable that the heat radiating layer is formed wider than the near-field light generating layer over the entire depth direction.

With this structure, a portion not in contact with the near-field light generating layer is secured in the heat radiating layer, so that the heat generated by the near-field light generating layer is efficiently radiated.

Further, it is preferable that the near-field light generating part is formed in an isosceles triangle with two sides connected to the generating end part having equal lengths and a bottom side part opposing the generating end part being arranged on a side of the heat radiating layer.

When the near-field light generating part is formed in such a shape, more surface plasmons can be concentrated on the generating end part.

Further, it is possible that the ridge part of the near-field light generating layer is formed along a direction orthogonal to the medium-opposing surface. By this, in the optical waveguide, a portion opposed to the ridge part is ensured largely.

It is possible that the main magnetic pole layer has a magnetic pole end part layer including the magnetic pole end face, and the magnetic pole end part layer is in contact with a front end face of the optical waveguide which is located along the medium-opposing surface.

When the main magnetic pole layer has such a magnetic pole end part layer, the light propagating through the optical waveguide can be efficiently reflected by the main magnetic pole layer.

Further it is possible that the main magnetic pole layer has a yoke magnetic pole layer in contact with an opposed region of an upper face of the optical waveguide which is opposed to the ridge part, the upper face being located on a side distant from the near-field light generating layer, and the yoke magnetic pole layer is junctioned to the magnetic pole end part layer.

Further, it is preferable that the magnetic pole end face is formed in a downward narrowing shape with a width gradually getting smaller as approaching to the generating end part.

When the magnetic pole end face is formed in such a shape, the magnetic flux can be intensively emitted from the main magnetic pole layer to a limited extremely small recording region of the magnetic recording medium where data will be recorded.

In this case, it is possible that the magnetic pole end part layer has a symmetrical structure formed to be bilaterally symmetrical about a portion of the magnetic pole end part layer opposed to the generating end part. Further, it is also possible that the magnetic pole end part layer and the yoke magnetic pole layer have a symmetrical structure formed to be bilaterally symmetrical about portions of the magnetic pole end part layer and the yoke magnetic pole layer opposed to the generating end part.

Further, it is also possible that the thermally assisted magnetic head further includes a return magnetic pole layer having a magnetic pole end face arranged within the medium-opposing surface; a linking magnetic pole layer magnetically linking the main magnetic pole layer to the return magnetic pole layer; and a thin-film coil wound about one of the main magnetic pole layer, the return magnetic pole layer, and the linking magnetic pole layer, wherein the heat radiating layer is arranged between the near-field light generating layer and the thin-film coil and is in contact with the thin-film coil via an interlayer insulating layer.

Further, it is preferable that the optical waveguide is formed along a direction orthogonal to the medium-opposing surface.

Further, it is preferable that a lower face of the optical waveguide opposed to the ridge part via the interposed layer is a flat face.

Further, it is preferable that assuming that a portion of the thin film coil arranged at a position most distant from the medium-opposing surface is a most distant conductive part, the heat radiating layer is formed in a rectangular plate shape having a size reaching a position more distant from the medium-opposing surface than is the most distant conductive part.

Preferably, the heat radiating layer is formed using a non-magnetic material higher in thermal conductivity and lower in coefficient of thermal expansion than the protective insulating layer. Further, it is preferable that the protective insulating layer is formed using an insulating material lower in hardness than the heat radiating layer.

Further, the present invention provides a method of manufacturing a thermally assisted magnetic head, including the following steps (1) to (6):

(1) forming a thin-film coil on a surface of a laminated body, and then forming an interlayer insulating layer on the surface of the laminated body to cover a surface of the thin-film coil;

(2) forming a heat radiating layer in a rectangular plate shape on the interlayer insulating layer;

(3) forming a near-field light generating layer in a triangle pole shape extending from a planned opposing surface position in a depth direction intersecting with the planned opposing surface position such that the near-field light generating layer is in contact with the heat radiating layer and a generating end part generating near-field light for heating a magnetic recording medium is arranged within the planned opposing surface position;

(4) forming an interposed layer on the near-field light generating layer;

(5) forming an optical waveguide guiding light to the near-field light generating layer in a manner to be opposed to a ridge part of the near-field light generating layer via the interposed layer; and (6) forming a main magnetic pole layer such that a magnetic pole end face is opposed to the generating end part via the interposed layer, on a side closer to the planned opposing surface position than is the optical waveguide.

In the above-described method of manufacturing a thermally assisted magnetic head, it is preferable that in the step of forming a heat radiating layer, the heat radiating layer is formed in a manner to be backed away from the planned opposing surface position, and the method further includes the following step (7):

(7) filling a gap between the heat radiating layer and the planned opposing surface position with an insulating material to form a protective insulating layer.

Further, in the above-described method of manufacturing a thermally assisted magnetic head, it is preferable that in the step of forming a heat radiating layer, the heat radiating layer is formed wider than the near-field light generating layer over the entire depth direction.

Further, in the above-described method of manufacturing a thermally assisted magnetic head, it is preferable that in the step of forming a main magnetic pole layer, a magnetic pole end part layer is formed, the magnetic pole end part layer including the magnetic pole end face and being in contact with a front end face of the optical waveguide which is located along the planned opposing surface position.

Further, the present invention provides a head gimbal assembly including a slider having a thermally assisted magnetic head formed thereon, the thermally assisted magnetic head including a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, wherein the near-field light generating layer has a near-field light generating part in a triangle shape with the generating end part being one vertex, and is formed in a triangle pole shape extending from the medium-opposing surface in a depth direction intersecting with the medium-opposing surface, wherein the optical waveguide is formed to be opposed to a ridge part of the near-field light generating layer via an interposed layer, the ridge part extending from the generating end part in the depth direction, wherein the magnetic pole end face of the main magnetic pole layer is formed to be opposed to the generating end part via the interposed layer, on a side closer to the medium-opposing surface than is the optical waveguide, and wherein the thermally assisted magnetic head includes a heat radiating layer in contact with an opposite side of the near-field light generating layer from the optical waveguide.

Further, the present invention provides a hard disk drive including a head gimbal assembly having a thermally assisted magnetic head, and a magnetic recording medium opposing the thermally assisted magnetic head, the thermally assisted magnetic head including a main magnetic pole layer having a magnetic pole end face arranged within a medium-opposing surface opposing the magnetic recording medium; a near-field light generating layer having a generating end part arranged within the medium-opposing surface, the generating end part generating near-field light for heating the magnetic recording medium; and an optical waveguide guiding light to the near-field light generating layer, wherein the near-field light generating layer has a near-field light generating part in a triangle shape with the generating end part being one vertex, and is formed in a triangle pole shape extending from the medium-opposing surface in a depth direction intersecting with the medium-opposing surface, wherein the optical waveguide is formed to be opposed to a ridge part of the near-field light generating layer via an interposed layer, the ridge part extending from the generating end part in the depth direction, wherein the magnetic pole end face of the main magnetic pole layer is formed to be opposed to the generating end part via the interposed layer, on a side closer to the medium-opposing surface than is the optical waveguide, and wherein the thermally assisted magnetic head includes a heat radiating layer in contact with an opposite side of the near-field light generating layer from the optical waveguide.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 8 is a sectional view illustrating a process of manufacturing the thermally assisted magnetic head in accordance with an embodiment of the present invention, in which (A) is a sectional view corresponding to FIG. 1, (B) is a sectional view corresponding to FIG. 2;

FIG. 9 is a sectional view illustrating a process subsequent to that in FIG. 8, in which (A) is a sectional view corresponding to FIG. 1, (B) is a sectional view corresponding to FIG. 2;

FIG. 13 is a sectional view illustrating a process subsequent to that in FIG. 12, in which (A) is a sectional view corresponding to FIG. 1, (B) is a sectional view corresponding to FIG. 2;

FIG. 14 is a sectional view illustrating a process subsequent to that in FIG. 13, in which (A) is a sectional view corresponding to FIG. 1, (B) is a sectional view corresponding to FIG. 2;

FIG. 15 is a sectional view illustrating a process subsequent to that in FIG. 14, in which (A) is a sectional view corresponding to. FIG. 1, (B) is a sectional view corresponding to FIG. 2;

DESCRIPTION OF THE PREFERRED EMBODIMENTS

In the following, embodiments of the present invention will be described with reference to the drawings. Note that the same components will be referred to with the same numerals or letters, while omitting their overlapping descriptions.

Structures of Thermally Assisted Magnetic Head

Figure 1:
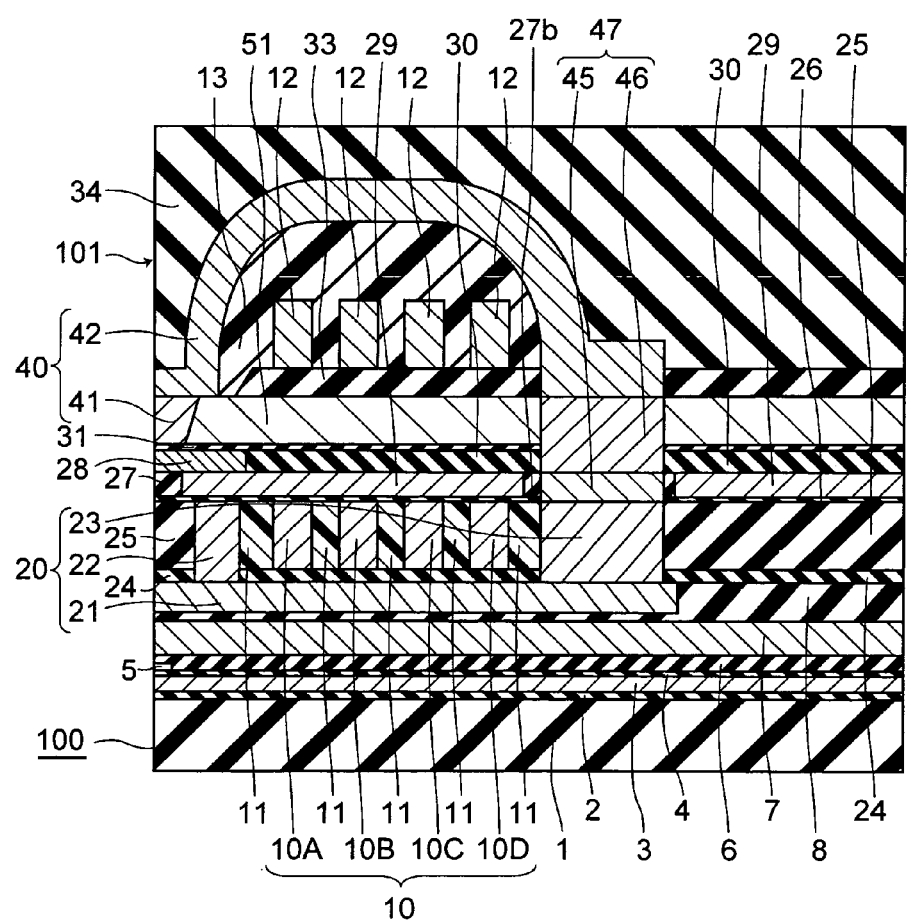
FIG. 1 is a sectional view of the thermally assisted magnetic head in accordance with an embodiment of the present invention taken along the line 1-1 of FIG. 3, which is a direction intersecting its ABS.
Figure 2:
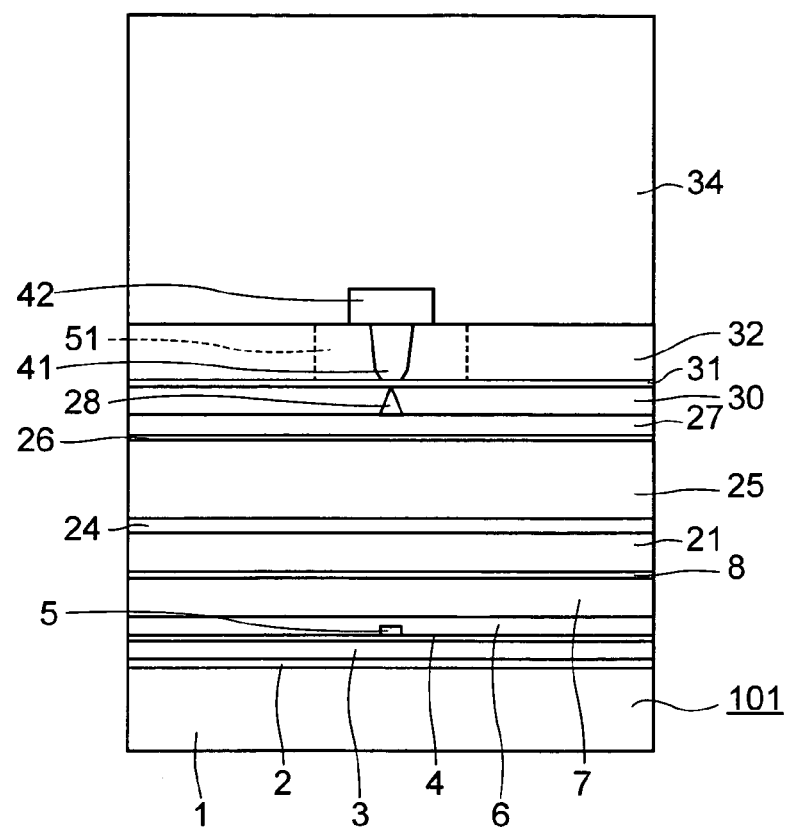
FIG. 2 is a front view illustrating the ABS of the thermally assisted magnetic head.
Figure 3:
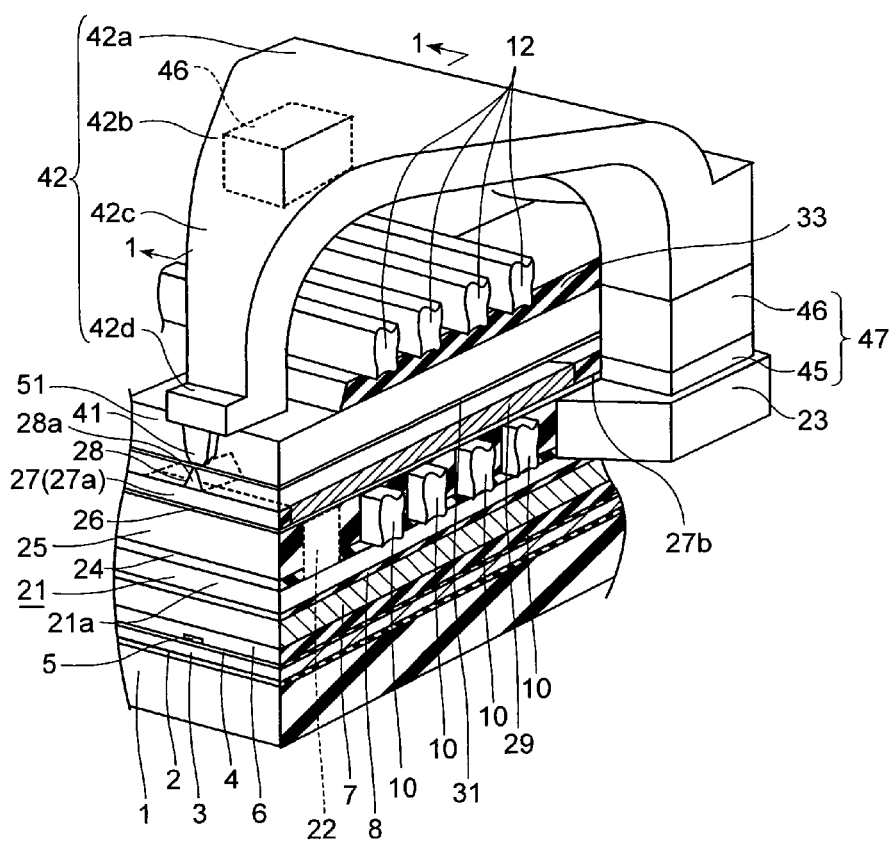
FIG. 3 is a perspective view illustrating an essential part of the thermally assisted magnetic head with a part thereof in section.
Figure 4:
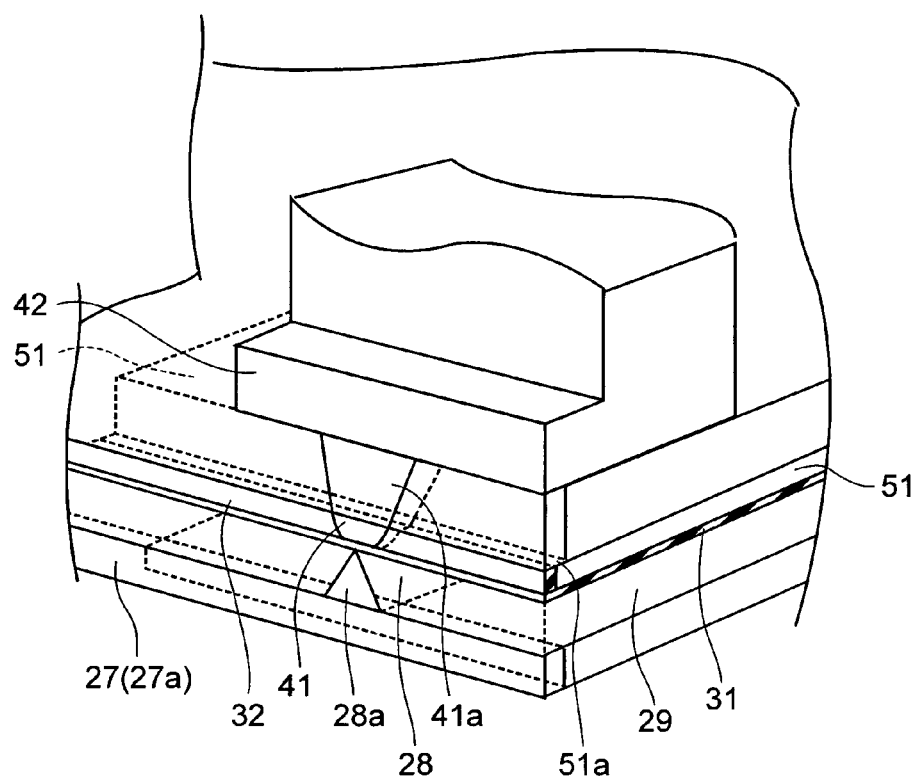
FIG. 4 is a perspective view illustrating an enlarged essential part of FIG. 3.

To begin with, the structure of a thermally assisted magnetic head will be described with reference to FIG. 1 to FIG. 4. Here, FIG. 1 is a sectional view of a thermally assisted magnetic head 100 in accordance with an embodiment of the present invention taken along the line 1-1 of FIG. 3 which is a direction intersecting with an air bearing surface (which will hereinafter be referred also to as "ABS"), while FIG. 2 is a front view illustrating an ABS 101 of the thermally assisted magnetic head 100. FIG. 3 is a perspective view illustrating an enlarged essential part of the thermally assisted magnetic head 100 with a part thereof illustrated in section, and FIG. 4 is a perspective view illustrating an enlarged essential part of FIG. 3. Note that the right and left direction (horizontal direction) in FIG. 2 is the track width direction, the upper direction is the moving direction of a magnetic recording medium, and the direction perpendicular to the paper surface is the direction perpendicular to the surface of the magnetic recording medium.

Thermally assisted magnetic head 100 comprises a substrate 1, reproducing head and recording head laminated on the substrate 1, while having the ABS 101 as a medium-opposing surface opposing a magnetic recording medium. The following will explain structures of main parts of the thermally assisted magnetic head 100, while structures of parts other than the main parts will later be explained in manufacturing processes.

The reproducing head has an MR device 5, arranged near the ABS 101, for detecting a magnetic signal. The reproducing head comprises a lower shield layer 3, a lower shield gap film 4, an upper shield gap film 6 and an upper shield layer 7.

An insulating layer 2 is further formed on the substrate 1, and the lower shield layer 3 made of a magnetic material is formed on the insulating layer 2. The lower shield gap film 4 as an insulating film is further formed on the lower shield layer 3, and the upper shield gap film 6 shielding the MR device 5 is formed on the lower shield gap film 4. The upper shield layer 7 made of a magnetic material is formed on the upper shield gap film 6, and an insulating layer 8 is formed on the upper shield layer 7.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The GMR device may be of a CIP (Current In Plane) type or a CPP (Current Perpendicular to Plane) type. In the CIP type, current for detecting a magnetic signal flows in a direction almost parallel to planes of the layers constituting the GMR device. In the CPP type, current for detecting a magnetic signal flows in a direction almost perpendicular to planes of the layers constituting the GMR device.

The recording head has a lower thin-film coil 10, an upper thin-film coil 12, a return magnetic pole layer 20, a protective insulating layer 27, a near-field light generating layer 28, a heat radiating layer 29, an interposed layer 31, a main magnetic pole layer 40, a linking magnetic pole layer 47, and an optical waveguide 51, and has a structure in which they are stacked on the substrate 1.

The lower thin-film coil 10 has four turn parts 10A, 10B, 10C, 10D. The lower thin-film coil 10 is wound like a flat spiral about a later-described rear magnetic pole layer 23 of the return magnetic pole layer 20. The lower thin-film coil 10 is connected to the upper thin-film coil 12 to form a series of coils.

The turn parts 10A, 10B, 10C, 10D are arranged at respective positions having different distances from the ABS 101. Among them, the turn part 10D is a part arranged at a position most distant from the ABS 101, and has a structure as a most distant conductive part in the present invention. The turn parts 10A, 10B, 10C, 10D are insulated from each other by a photoresist 11.

The upper thin-film coil 12 has four turn parts similarly to the lower thin-film coil 10. The turn parts are insulated from each other by a photoresist 13. The upper thin-film coil 12 is wound like a flat spiral about a later-described yoke magnetic pole layer 42 of the main magnetic pole layer 40.

When a current modulated according to data to be recorded on the magnetic recording medium flows through the lower thin-film coil 10 and the upper thin-film coil 12, the current causes the lower thin-film coil 10 and the upper thin-film coil 12 to generate a recording magnetic field.

The return magnetic pole layer 20 has a connecting magnetic pole layer 21, a front magnetic pole layer 22, and the rear magnetic pole layer 23. The connecting magnetic pole layer 21 has a magnetic pole end face 21a arranged within the ABS 101 and has a portion that is more distant from the ABS 101 than is the magnetic pole end face 21a being embedded in the insulating layer 8. The connecting magnetic pole layer 21 has a size reaching a position more distant from the ABS 101 than is the turn part 10D. To the connecting magnetic pole layer 21, the front magnetic pole layer 22 is junctioned on the side closer to the ABS 101 than is the lower thin-film coil 10, and the rear magnetic pole layer 23 is junctioned at a position more distant from the ABS 101 than is the turn part 10D.

The front magnetic pole layer 22 is distant from the ABS 101 and arranged between the ABS 101 and the turn part 10A. The rear magnetic pole layer 23 is arranged at a position more distant from the ABS 101 than is the turn part 10D, and is junctioned to the connecting magnetic pole layer 21 and a later-described lower magnetic pole layer 45.

The return magnetic pole layer 20 is provided to return a magnetic flux to the main magnetic pole layer 40. When a magnetic flux generated by the recording magnetic field is emitted from a later-described magnetic pole end face 41a of the main magnetic pole layer 40 to the magnetic recording medium, the magnetic flux flows back to the return magnetic pole layer 20 via the magnetic recording medium (a not-depicted soft magnetic layer in detail). This magnetic flux passes through the linking magnetic pole layer 47 and reaches the main magnetic pole layer 40.

Figure 5:
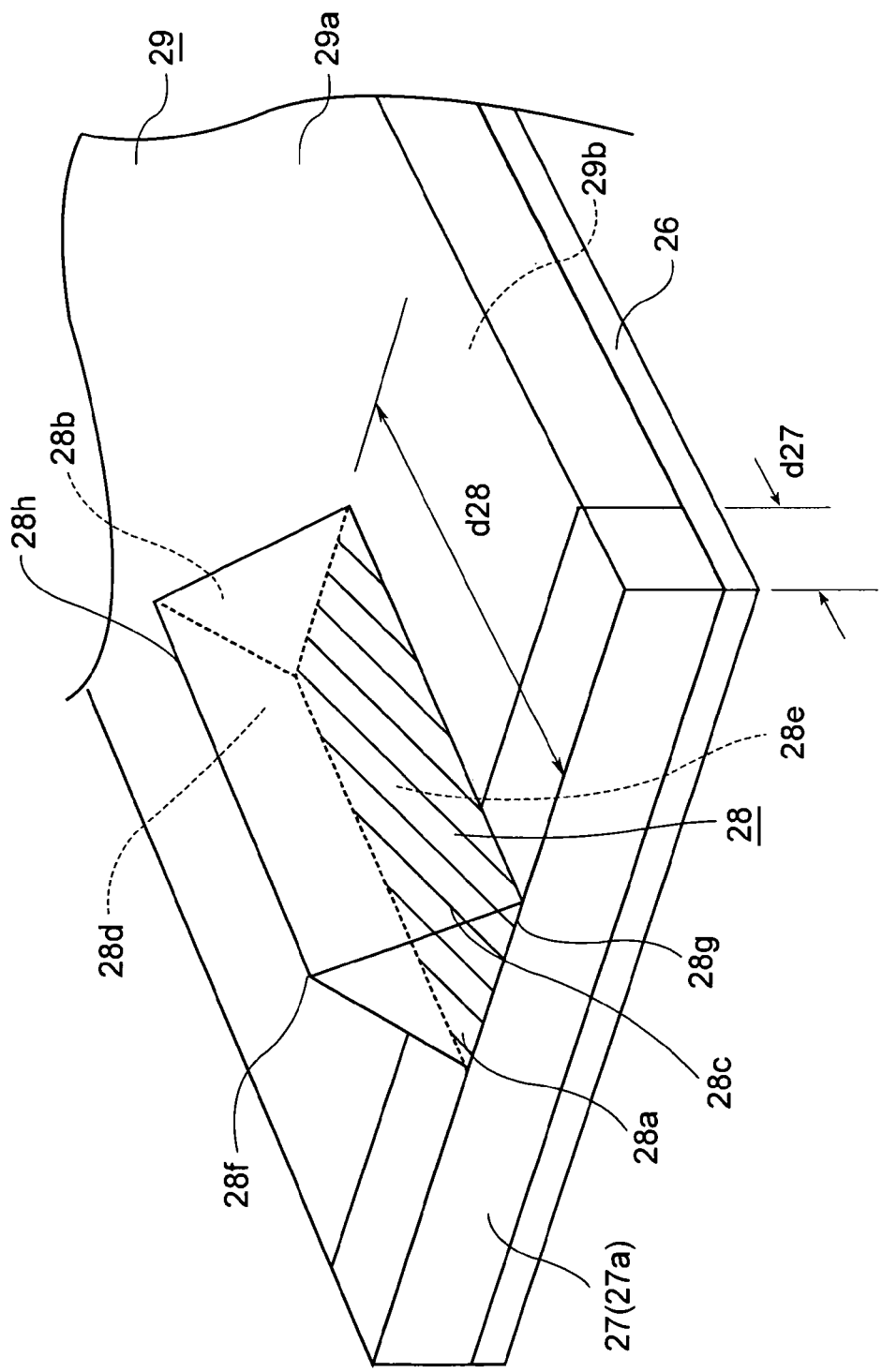
FIG. 5 is a perspective view illustrating a near-field light generating layer together with a protective insulating layer and a heat radiating layer.

The protective insulating layer 27 and the near-field light generating layer 28 will be described next with reference to FIG. 5 in addition to FIG. 1 to FIG. 4. FIG. 5 is a perspective view illustrating the near-field light generating layer 28 together with the protective insulating layer 27 and the heat radiating layer 29.

A portion of the surface of the protective insulating layer 27 is exposed at the ABS 101. The protective insulating layer 27 is arranged between the ABS 101 and the heat radiating layer 29. The protective insulating layer 27 has a depth from the ABS 101 (the distance from the ABS 101 in a direction perpendicular to the ABS 101 is also referred to as a "depth") d 27. Further, the protective insulating layer 27 is made of an insulating material having a lower hardness (namely, softer) than that of the heat radiating layer 29 and, for example, alumina ($Al_2O_3$) can be used.

The near-field light generating layer 28 has a near-field light generating part 28a, and is formed in a triangle pole shape extending in a direction orthogonal to the ABS 101 (hereinafter, referred to as a "depth direction") to become distant from the ABS 101. In addition to the near-field light generating part 28a, the near-field light generating layer 28 has an opposing part 28b opposing the near-field light generating part 28a and further has three side face parts 28c, 28d, 28e which continue to the near-field light generating part 28a and the opposing part 28b. Only the side face part 28e (referred also to as a bottom face part that is a part with hatching in FIG. 5) of the three side face parts 28c, 28d, 28e is in direct contact with the protective insulating layer 27 and the heat radiating layer 29, whereas the two side face parts 28c, 28d are distant from the protective insulating layer 27 and the heat radiating layer 29 and stand in oblique directions. The two side face parts 28c, 28d are in contact with each other at a position distant from the protective insulating layer 27 and the heat radiating layer 29, and a portion where the side face parts 28c, 28d are in contact with each other forms a ridge part 28h. The ridge part 28h is linearly formed along the depth direction from a generating end part 28f. The near-field light generating layer 28 is structured to be bilaterally symmetrical about the ridge part 28h.

The near-field light generating layer 28 has a depth d28 from the ABS 101. The depth d28 is larger than the depth d27 (d28>d27). Therefore, the most of the side face part 28e is in direct contact with a later-described upper face 29a of the heat radiating layer 29.

The surrounding space of the near-field light generating layer 28 is filled with a dielectric substance layer 30. The dielectric substance layer 30 is formed using a dielectric substance such as alumina or the like. However, illustration of the dielectric substance layer 30 is omitted in FIG. 3, FIG. 4, FIG. 5.

The near-field light generating layer 28 is made of metal and formed of, for example, one of Au, Ag, Al, Cu, Pd, Pt, Rh, Ir or an alloy made of a plurality of those elements.

The whole near-field light generating part 28a is arranged within the ABS 101. The near-field light generating part 28a is formed in the shape of an isosceles triangle with the generating end part 28f being one vertex. The isosceles triangle is formed such that the two sides connected to the later-described generating end part 28f have equal lengths. Further, the near-field light generating part 28a is formed such that the generating end part 28f is one vertex distant from the protective insulating layer 27 and the heat radiating layer 29 and a bottom side part 28g opposing the generating end part 28f is arranged on the side of the protective insulating layer 27 and the heat radiating layer 29. The width in the track width direction (referred also to as a lateral width) of the bottom side part 28g is about 0.2 μm. The generating end part 28f generates near-field light for heating the magnetic recording medium as will be described later in detail.

The heat radiating layer 29 has a function as a heat sink which takes in heat generated by the near-field light generating layer 28 from the near-field light generating layer 28 and radiates the heat to the outside of the near-field light generating layer 28. The heat radiating layer 29 has the following wide structure. The wide structure means a structure that the lateral width is larger than that of the near-field light generating layer 28 over the entire depth direction. The heat radiating layer 29 has a fixed lateral width over the entire depth direction, for example, as illustrated in FIG. 21(A).

The heat radiating layer 29 is arranged at a position distant from the ABS 101 (a position backed away from the ABS 101) by the distance corresponding to the protective insulating layer 27. Further, the heat radiating layer 29 is arranged on the side opposite to the main magnetic pole layer 40 with the near-field light generating layer 28 in between, and arranged between the near-field light generating layer 28 and the lower thin-film coil 10. Further, the heat radiating layer 29 has an upper face (a face distant from the substrate 1 being referred to as an "upper face" and the side opposite thereto being referred to as a "lower face" in this embodiment) 29a being in contact with the side face part 28e of the near-field light generating layer 28 (that is, the side face on the opposite side of the near-field light generating layer 28 from the optical waveguide 51), and a lower face 29b being in contact with the lower thin-film coil 10 via an interlayer insulating layer 26.

Figure 21A:
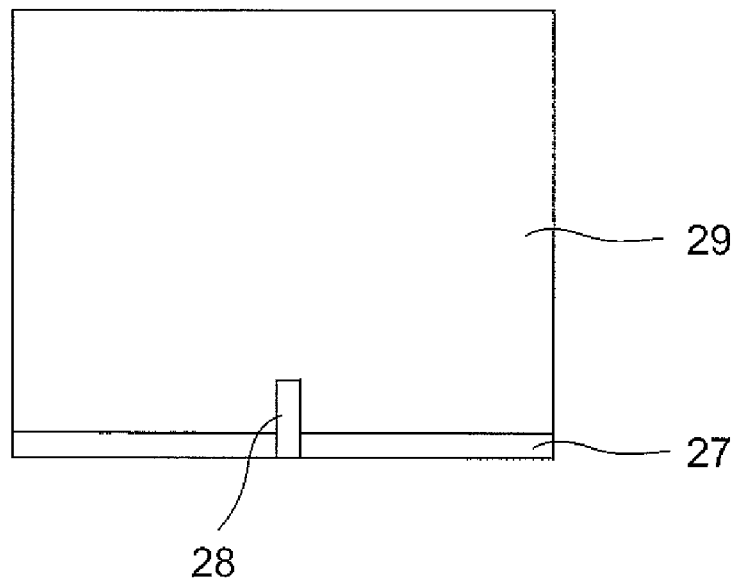
FIG. 21 is a plan view illustrating a near-field light generating layer and a heat radiating layer according to an embodiment of the present invention, in which (A) illustrates a case where the heat radiating layer is formed with a uniform width over the entire depth direction, and (B) illustrates a case where a portion on the rear face side of the heat radiating layer is formed with a smaller width.

Further, the heat radiating layer 29 is formed in a rectangular plate shape having a size reaching to a position more distant from the ABS 101 than is the turn part 10D (see FIG. 21(A)). The thickness of the heat radiating layer 29 is, for example, about 0.7 μm to about 1.2 μm.

To realize the function as the above-described heat sink, the heat radiating layer 29 can be formed using, for example, SiC (silicon carbide), AlN, Si$_3$N$_4$, W (tungsten) or the like. It is specifically preferable to use a non-magnetic material having a higher thermal conductivity and a lower coefficient of thermal expansion than those of the protective insulating layer 27. For example, SiC has a higher thermal conductivity than that of alumina constituting the protective insulating layer 27 and is thus more excellent in heat radiation action than alumina.

For this reason, when the heat radiating layer 29 is formed using SiC, the heat generated by the near-field light generating layer 28 is conducted more to the heat radiating layer 29 than to the protective insulating layer 27, and radiated from the heat radiating layer 29 to the outside of the near-field light generating layer 28. Further, SiC has a lower coefficient of thermal expansion than that of alumina. Therefore, by using SiC, the heat radiating layer 29 has a structure to hardly expand even when the heat from the near-field light generating layer 28 is conducted thereto.

The interposed layer 31 is formed directly on the upper faces of the near-field light generating layer 28 and the dielectric substance layer 30, along the ridge part 28h of the near-field light generating layer 28. The interposed layer 31 electrically separates the near-field light generating layer 28 and the dielectric substance layer 30 from the main magnetic pole layer 40 and the optical waveguide 51. The interposed layer 31 is formed using a dielectric substance having a lower refractive index than that of the optical waveguide 51, and for example, using alumina. The interposed layer 31 has a thickness of, for example, about 10 nm to about 70 nm, which is much smaller than those of the main magnetic pole layer 40 and the optical waveguide 51, and is thus referred also to as a very-thin interposed layer.

Figure 6:
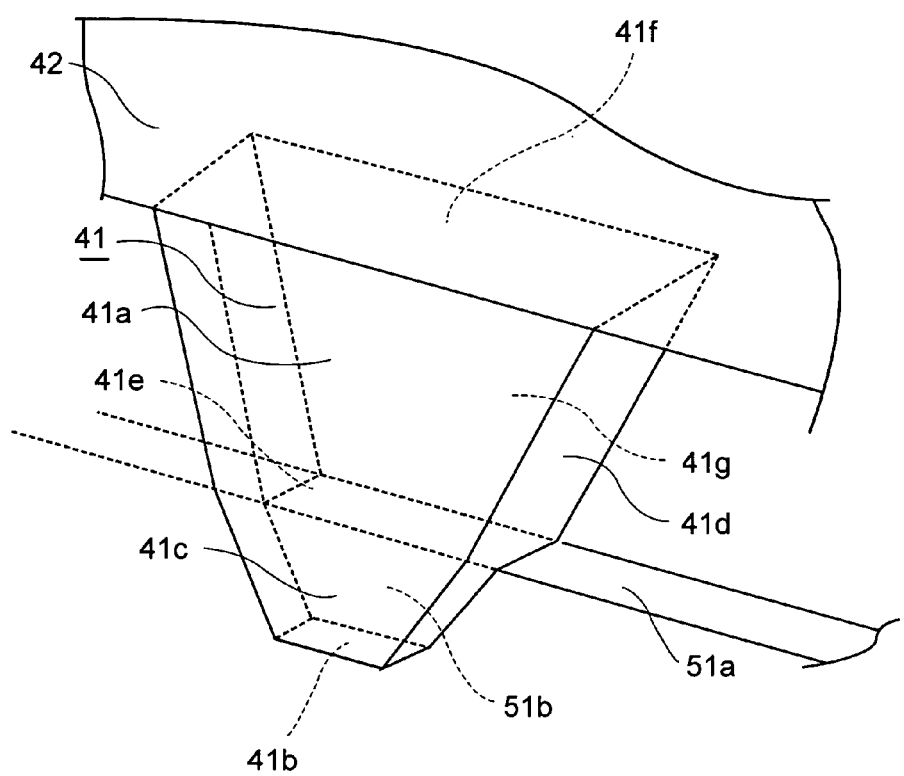
FIG. 6 is a perspective view illustrating a magnetic pole end part layer and a portion of a yoke magnetic pole layer which constitute a main magnetic pole layer.
Figure 7:
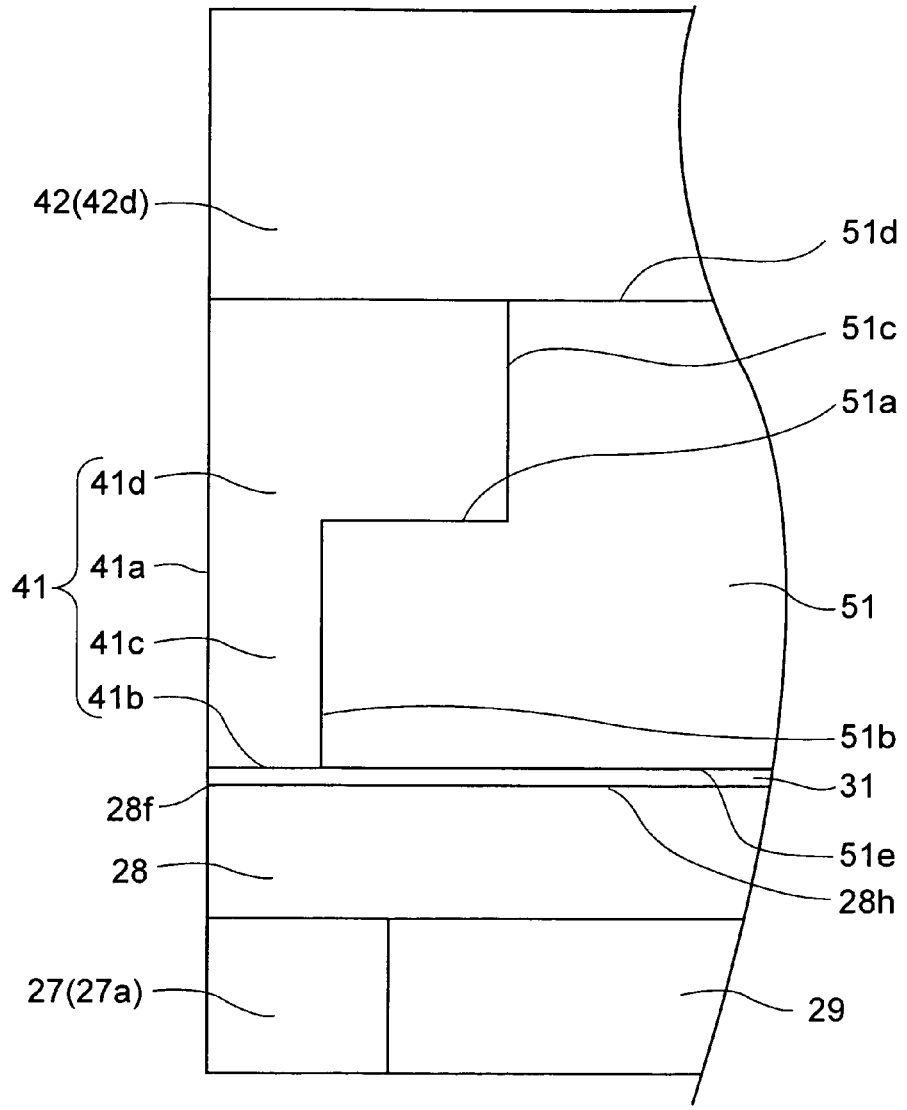
FIG. 7 is a side view illustrating the magnetic pole end part layer and a portion of the yoke magnetic pole layer.

Next, the main magnetic pole layer 40 will be described with reference to FIG. 6, FIG. 7 in addition to FIG. 1 to FIG. 5. Here, FIG. 6 is a perspective view illustrating a magnetic pole end part layer 41 and a portion of the yoke magnetic pole layer 42 which constitute the main magnetic pole layer 40, and FIG. 7 is a side view illustrating the magnetic pole end part layer 41 and a portion of the yoke magnetic pole layer 42.

The main magnetic pole layer 40 is formed on the side closer to the ABS 101 than is the optical waveguide 51 in a manner to be opposed to the generating end part 28f of the near-field light generating layer 28 via the interposed layer 31. The main magnetic pole layer 40 has the magnetic pole end part layer 41 and the yoke magnetic pole layer 42 both of which are in direct contact, from the outside, with a portion of the optical waveguide 51. The portion of the optical waveguide 51 has a certain width from a middle portion in the track width direction (see FIG. 3 and FIG. 4 for detail). Further, the magnetic pole end part layer 41 and the yoke magnetic pole layer 42 have a symmetrical structure formed to be bilaterally symmetrical about portions thereof opposed to the generating end part 28f, that is, about a central portion in the track width direction of a later-described lower end part 41b.

The magnetic pole end part layer 41 is arranged on the upper side of the interposed layer 31 and arranged on the side opposite to the protective insulating layer 27 and the heat radiating layer 29 with the near-field light generating layer 28 in between. The magnetic pole end part layer 41 has the magnetic pole end face 41a arranged within the ABS 101 as particularly illustrated in FIG. 4, FIG. 6. Further, the magnetic pole end part layer 41 has the lower end part 41b in a flat rectangular shape on the lowest side (namely, on the near-field light generating layer 28 side), and the lower end part 41b is opposed to the generating end part 28f of the near-field light generating layer 28 with the interposed layer 31 in between.

The magnetic pole end part layer 41 has a first magnetic pole part 41c including the lower end part 41b and a second magnetic pole part 41d continuing to the first magnetic pole part 41c, and has a step structure including a step formed by both of the first magnetic pole part 41c and the second magnetic pole part 41d. The magnetic pole end part layer 41 is formed to be larger in lateral width than the near-field light generating layer 28 and to have a lateral width at its upper end portion of about 0.3 μm to 0.5 μm.

The first magnetic pole part 41c is a portion lower than a later-described middle step face 51a of the optical waveguide 51 and is embedded in a front insulating layer 32 and formed in a downward narrowing shape. Further, the first magnetic pole part 41c is in direct contact with a later-described lower front end face 51b of the optical waveguide 51.

The second magnetic pole part 41d is a portion upper than the middle step face 51a and is formed in the downward narrowing shape. The second magnetic pole part 41d is connected, on the ABS 101 side, to the first magnetic pole part 41c. Further, a portion of the second magnetic pole part 41d connected to the first magnetic pole part 41c has, on the rear side, a rectangular end face 41e in direct contact with the middle step face 51a. Further, the second magnetic pole part 41d has, on an uppermost side, a rectangular end face 41f junctioned to the yoke magnetic pole layer 42 and has, on the rear face side, a rear face part 41g in direct contact with a later-described upper front end face 51c of the optical waveguide 51.

Note that the downward narrowing shape of the first magnetic pole part 41c and the second magnetic pole part 41d means a shape having a width in the track width direction gradually getting smaller as it approaches to the near-field light generating layer 28 along the ABS 101. Since the first magnetic pole part 41c and the second magnetic pole part 41d are formed in the downward narrowing shape, the magnetic pole end face 41a is formed in a V-shape or a U-shape as a whole though the magnetic pole end face 41a is also in the downward narrowing shape.

The yoke magnetic pole layer 42 has a rear magnetic pole layer 42a, a middle magnetic pole layer 42b, a middle magnetic pole layer 42c, and a front magnetic pole layer 42d particularly illustrated in FIG. 3. The yoke magnetic pole layer 42 has a curved structure extending from the ABS 101 in the depth direction and leading to the linking magnetic pole layer 47 straddling the upper thin-film coil 12.

The rear magnetic pole layer 42a is arranged at a position more distant from the ABS 101 than are the four turn parts of the upper thin-film coil 12. The rear magnetic pole layer 42a has a lateral width larger than that of the middle magnetic pole layer 42b (the largest lateral width in the yoke magnetic pole layer 42) and is junctioned to a later-described upper magnetic pole layer 46 of the linking magnetic pole layer 47. The middle magnetic pole layer 42b is arranged above the upper thin-film coil 12. The middle magnetic pole layer 42b is connected to the rear magnetic pole layer 42a and the middle magnetic pole layer 42c. The middle magnetic pole layer 42b has a lateral width gradually getting smaller as it approaches to the ABS 101 and is formed in a downward curved structure getting closer to the magnetic pole end part layer 41 as it approaches to the ABS 101.

The middle magnetic pole layer 42c is connected to the middle magnetic pole layer 42b and the front magnetic pole layer 42*d*, and has a lateral width getting smaller than the middle magnetic pole layer 42*b* as it approaches to the ABS 101. Further, the middle magnetic pole layer 42*c* is generally formed in a direction along the ABS 101.

The front magnetic pole layer 42*d* is formed in a rectangular plate shape having a lateral width larger than that of the magnetic pole end part layer 41. The front magnetic pole layer 42*d* has a magnetic pole end face arranged within the ABS 101. The front magnetic pole layer 42*d* has a bottom face part that is junctioned to the rectangular end face 41*f* of the magnetic pole layer 41 on the ABS 101 side and is in contact with an upper face 51*d* of the optical waveguide 51 on the rear side. Since a portion of the upper face 51*d* which is opposed to the near-field light generating layer 28 is an opposed region, the front magnetic pole layer 42*d* is in contact with the opposed region of the optical waveguide 51.

Next, the linking magnetic pole layer 47 will be described. The linking magnetic pole layer 47 has a structure that a lower magnetic pole layer 45 and the upper magnetic pole layer 46 are junctioned together as particularly illustrated in FIG. 3. The linking magnetic pole layer 47 is arranged in a manner to hold the optical waveguide 51 from both right and left sides at a position more distant from the ABS 101 than are the four turn parts of the lower thin-film coil 10 and the upper thin-film coil 12, and is in contact with the side faces of the optical waveguide 51. The lower magnetic pole layer 45 is junctioned to the rear magnetic pole layer 23, and the upper magnetic pole layer 46 is junctioned to the lower magnetic pole layer 45 and the yoke magnetic pole layer 42. The linking magnetic pole layer 47 magnetically links the return magnetic pole layer 20 to the main magnetic pole layer 40, and has a role of returning, to the main magnetic pole layer 40, the magnetic flux flown back to the return magnetic pole layer 20.

Figure 16:
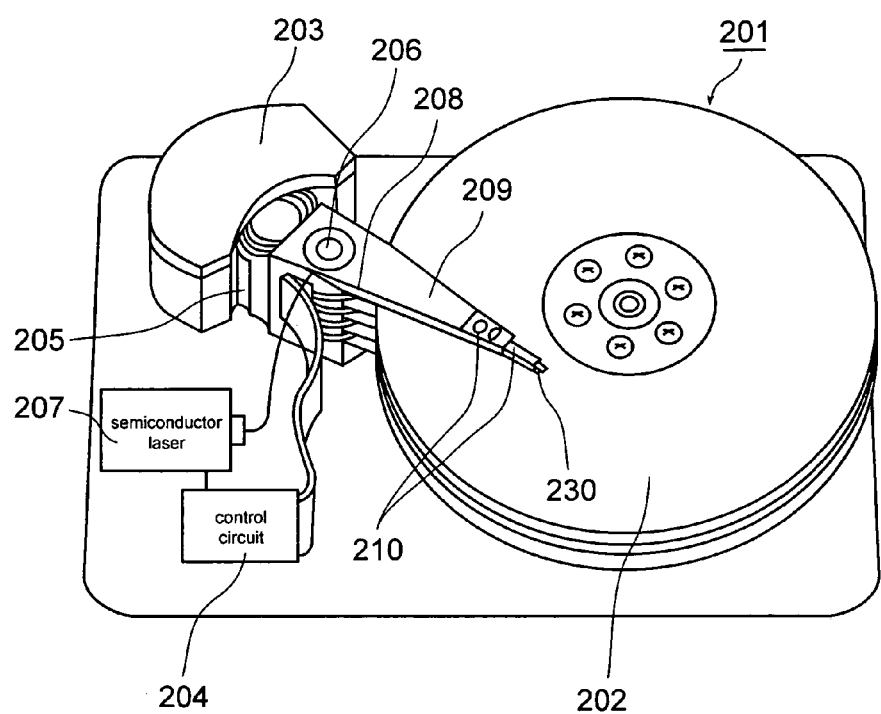
FIG. 16 is a perspective view illustrating a hard disk drive equipped with the thermally assisted magnetic head in FIG. 1.

Further, the optical waveguide 51 will be described. The optical waveguide 51 is arranged on the side opposite to the heat radiating layer 29 with the near-field light generating layer 28 in between, passes through (penetrates) the linking magnetic pole layer 47 to approach the ABS 101 from the rear side, and is formed in the depth direction. To the optical waveguide 51, an optical fiber 208 not illustrated in FIG. 1 to FIG. 3 is connected. Laser light generated by a semiconductor laser 207 are inputted to the optical waveguide 51 via the optical fiber 208. The optical waveguide 51 is formed using a dielectric substance which transmits laser light, such as $Ta_2O_5$ or the like and has a thickness of about 0.4 μm to about 1.5 μm. Note that the semiconductor laser 207 and the optical fiber 208 are illustrated in FIG. 16 (both of them will be described later in detail).

The optical waveguide 51 is arranged on the rear side of the magnetic pole end part layer 41 and is in direct contact with the interposed layer 31, and is formed to be opposed to the ridge part 28*h* of the near-field light generating layer 28 via the interposed layer 31. The optical waveguide 51 has the middle step face 51*a*, the lower front end face 51*b* and the upper front end face 51*c* on the ABS 101 side and further has the upper face 51*d* and a lower face 51*e* as illustrated in FIG. 7. The optical waveguide 51 has a stepped structure in which steps are formed by the middle step face 51*a*, the lower front end face 51*b*, the upper front end face 51*c*, and the upper face 51*d*.

The middle step face 51*a* is formed to be flat along the depth direction and is in contact with the second magnetic pole part 41*d*. The lower front end face 51*b* is formed to be flat along the ABS 101 and is in contact with the first magnetic pole part 41*c*. The upper front end face 51*c* is formed to be flat along the ABS 101 and is in contact with the second magnetic pole part 41*d*. The upper face 51*d* is a flat face of the optical waveguide 51 which is located on the side distant from the near-field light generating layer 28, and is formed along the depth direction and junctioned to the front magnetic pole layer 42*d* of the yoke magnetic pole layer 42. The lower face 51*e* is a flat face of the optical waveguide 51 which is located on the near-field light generating layer 28 side, and is formed along the depth direction and is in direct contact with the interposed layer 31. The lower face 51*e* has a portion on the ABS 101 side opposed to the ridge part 28*h* via the interposed layer 31.

Operation Contents of Thermally Assisted Magnetic Head

Subsequently, the magnetic recording operation of the thermally assisted magnetic head having the above structure will be described as follows.

When a current modulated according to data to be recorded on the magnetic recording medium is caused to flow through the lower thin-film coil 10 and the upper thin-film coil 12, the lower thin-film coil 10 and the upper thin-film coil 12 generate a recording magnetic field by the current. The recording magnetic field passes through the main magnetic pole layer 40, and a magnetic flux caused by the recording magnetic field is emitted from the magnetic pole end face 41*a* to the magnetic recording medium. With this magnetic flux, the data is recorded on the magnetic recording medium.

On the other hand, when the semiconductor laser 207 generates laser light, the laser light are transmitted to the optical waveguide 51 via the optical fiber 208. The laser light move through the optical waveguide 51 to the ABS 101. Since the near-field light generating layer 28 is arranged on the ABS 101 side of the optical waveguide 51 via the interposed layer 31, the laser light moved through the optical waveguide 51 to close to the ABS 101 are applied to the near-field light generating layer 28 via the interposed layer 31.

In this event, a part of the laser light propagating through the optical waveguide 51 are reflected by the main magnetic pole layer 40 because the main magnetic pole layer 40 is in contact with the lower front end face 51*b*, the upper front end face 51*c* and the upper face 51*d* of the optical waveguide 51. Therefore, more laser light are applied to the near-field light generating layer 28. Further, the magnetic pole end part layer 41 and the yoke magnetic pole layer 42 have a symmetrical structure and thereby reflect the laser light more efficiently, so that more laser light are applied to the near-field light generating layer 28. In addition, the main magnetic pole layer 40 is in contact with a portion having a certain width from a middle portion in the track width direction of the optical waveguide 51 and the near-field light generating layer 28 is arranged at the middle portion of the main magnetic pole layer 40. Therefore, the reflection of the laser light by the main magnetic pole layer 40 very effectively acts on the application to the near-field light generating layer 28. In other words, the laser light reflected by the main magnetic pole layer 40 are more efficiently applied to the near-field light generating layer 28.

Further, the interposed layer 31 having a lower refractive index than that of optical waveguide 51 is in contact with the optical waveguide 51. Therefore, when laser light enter the interposed layer 31 from the optical waveguide 51 and are totally reflected, evanescent light seeps near the surface of the interposed layer 31 having a lower refractive index. The use of the evanescent light makes it possible to match the phase speed thereof with the phase speed of surface plasmons and excite surface plasmons at the near-field light generating layer 28.

The surface plasmons propagate to the generating end part 28*f* arranged on the ABS 101 side of the near-field light generating layer 28, and the surface plasmons are concentrated on the generating end part 28*f* because the generating end part 28f is the vertex interposed between equal sides of the near-field light generating part 28a in the isosceles triangle. Then, a near-field light having a very high electric field intensity is generated near the generating end part 28f.

The near-field light is applied from the generating end part 28f to the magnetic recording medium and reaches the surface of the magnetic recording medium. Then, a limited extremely small region in the magnetic recording layer of the magnetic recording medium is intensively heated by the near-field light. In the magnetic recording layer, the coercive force reduces to an extent at which data can be recorded by the magnetic flux caused by the recording magnetic field.

In the thermally assisted magnetic head 100, the coercive force can be reduced in the above-descried manner, so that data can be recorded also on a magnetic recording medium having a high coercive force for high-density recording.

Figure 18:
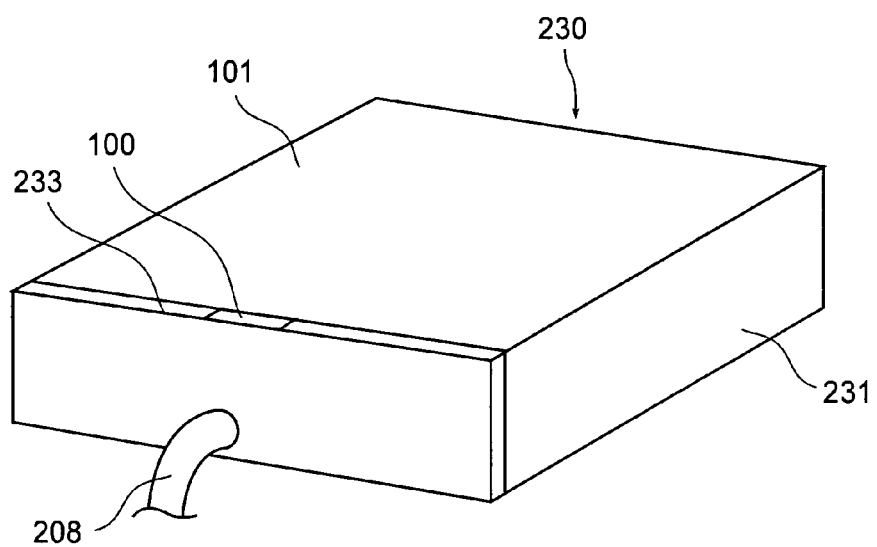
FIG. 18 is a perspective view illustrating a slider.
Figure 19:
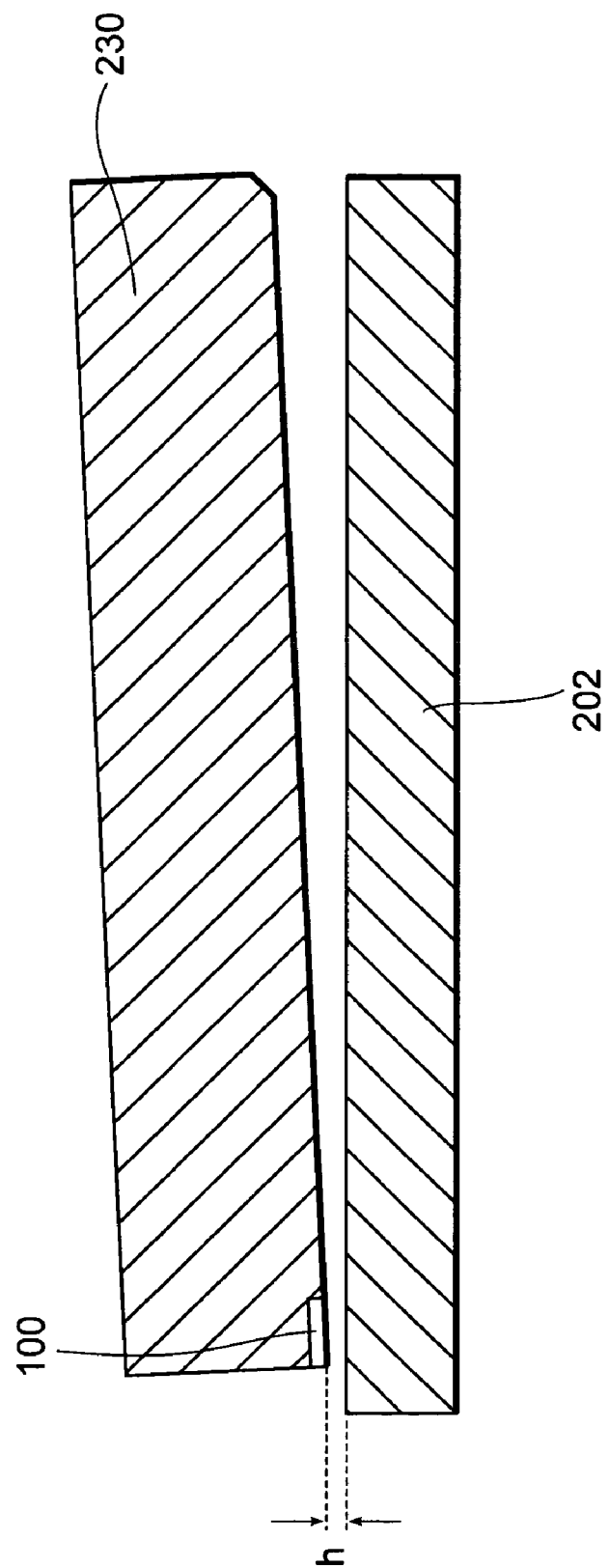
FIG. 19 is a sectional view illustrating a slider equipped with a thermally assisted magnetic head and an example of magnetic recording media.

However, in the thermally assisted magnetic head 100, the temperature of the near-field light generating layer 28 significantly increases accompanying generation of near-field light. The near-field light generating layer 28 is made of metal such as gold, silver, aluminum, palladium or the like and thus causes self expansion due to its own heat generation. Then, the near-field light generating layer 28 projects from the ABS 101 to the magnetic recording medium. The thermally assisted magnetic head 100 is incorporated in a later-described slider 230 as illustrate in FIG. 18, and the slider 230 floats from the magnetic recording medium 202 by a minute distance h as illustrated in FIG. 19. If the near-field light generating layer 28 projects from the ABS 101, the thermally assisted magnetic head 100 is likely to collide with the magnetic recording medium 202, thereby causing the hard disk drive to fail.

In addition, the significant increase in temperature of the near-field light generating layer 28 accompanying generation of near-field light brings about the possibility that particularly the generating end part 28f of the near-field light generating layer 28 may melt. The melting deforms the near-field light generating part 28a to make it difficult to intensively heat the extremely small recording region of the magnetic recording medium.

However, since the thermally assisted magnetic head 100 has the heat radiating layer 29 that is in direct contact with the near-field light generating layer 28, the heat generated by the near-field light generating layer 28 is directly conducted to the heat radiating layer 29. Then, the heat generated by the near-field light generating layer 28 will escape from the heat radiating layer 29 to the outside of the near-field light generating layer 28. Therefore, the near-field light generating layer 28 becomes to cause no self expansion due to its own heat generation. Accordingly, the thermally assisted magnetic head 100 can prevent a situation that the near-field light generating layer 28 projects from the ABS 101, and thus has a structure capable of preventing failure of the hard disk drive. Further, the possibility that the generating end part 28f may melt is also overcome, so that the extremely small region of the magnetic recording medium can be intensively heated by the generating end part 28f.

In addition, the heat radiating layer 29 is formed to be wider than the near-field light generating layer 28 over the entire depth direction, and formed in a flat plate shape. Therefore, a large portion which is not in contact with the near-field light generating layer 28 is secured on the upper face 29a of the heat radiating layer 29. Accordingly, by the heat radiating layer 29, the heat conducted from the near-field light generating layer 28 can be efficiently radiated to the outside of the near-field light generating layer 28. Further, when the heat radiating layer 29 is formed using SiC, the heat radiating layer 29 is able to radiate the heat of the near-field light generating layer 28 efficiently, and the heat radiating layer 29 is structured to be hard to expand even if heated.

On the other hand, in the thermally assisted magnetic head 100, the heat radiating layer 29 is backed away from the ABS 101. Also in this point, the thermally assisted magnetic head 100 is structured to be capable of preventing failure of the hard disk drive.

It is assumed that the heat radiating layer 29 is made of a non-magnetic material such as SiC or the like having a higher hardness than that of alumina and is structured to be exposed in the ABS 101 in the thermally assisted magnetic head 100. Then, when polishing for forming the ABS 101 is performed on a laminated body for manufacturing the thermally assisted magnetic head 100, the heat radiating layer 29 may project from the ABS 101. This is because the heat radiating layer 29 is hard to be polished due to its higher hardness than that of alumina and thus remains. Also when the heat radiating layer 29 projects from the ABS 101 for such a reason, the hard disk drive becomes more likely to fail. However, the thermally assisted magnetic head 100 is structured to be capable of also preventing such failure. In addition, the protective insulating layer 27 is arranged between the ABS 101 and the heat radiating layer 29 and thereby can protect the heat radiating layer 29.

On the other hand, when performing the magnetic recording operation, current flows through the lower thin-film coil 10. Then, the lower thin-film coil 10 generates heat due to its own electric resistance. The lower thin-film coil 10 is made of metal such as copper or the like and therefore causes self expansion by the generated heat. Then, the front magnetic pole layer 22 will be pushed out of the ABS 101, thereby also causing the hard disk drive to fail.

However, since the lower face 29b of the heat radiating layer 29 is in contact with the lower thin-film coil 10 via the interlayer insulating layer 26, the heat generated by the lower thin-film coil 10 can also be conducted to the heat radiating layer 29 and radiated from the heat radiating layer 29 to the outside of the lower thin-film coil 10. Accordingly, the thermally assisted magnetic head 100 is structured to be capable preventing failure of the hard disk drive due to the heat generation by the lower thin-film coil 10. In addition, the heat radiating layer 29 has a size reaching a position more distant from the ABS 101 than is the turn part 10D, so that the heat generated by the lower thin-film coil 10 can be more efficiently radiated.

Moreover, the laser light propagating through the optical waveguide 51 are applied to the near-field light generating layer 28 after being reflected by the main magnetic pole layer 40 (the laser light are indirectly applied to the near-field light generating layer 28), not directly applied to the near-field light generating layer 28. Therefore, in the thermally assisted magnetic head 100, the temperature increase of the near-field light generating layer 28 due to the direct application of the laser light can be suppressed, thereby less causing self expansion and melting of the near-field light generating layer 28. Accordingly, the thermally assisted magnetic head 100 surely prevents the situation that the near-field light generating layer 28 projects from the ABS 101, thereby more surely preventing failure of the hard disk drive. In addition, the thermally assisted magnetic head 100 can intensively heat the extremely small region of the magnetic recording medium.

In addition to the above operation and effect, the thermally assisted magnetic head 100 can provide the following operation and effect.

The near-field light generating layer 28 includes the near-field light generating part 28a, extends from the ABS 101 in the depth direction, and is formed in a triangle pole shape having the generating end part 28f and the ridge part 28h, and the bottom side part 28g is arranged on the heat radiating layer 29 side. In addition, the flat lower face 51e of the optical waveguide 51 is opposed to the ridge part 28h via the interposed layer 31. The near-field light generating layer 28 has the three side faces 28c, 28d, 28e and can take in laser light utilizing two of them (the side faces 28c, 28d). Accordingly, the near-field light generating layer 28 will take in laser light from a wider region, so that the laser light moving through the optical waveguide 51 are efficiently introduced into the near-field light generating layer 28. Furthermore, since the ridge part 28h and the optical waveguide 51 are formed along the depth direction, the size of the opposed region in the optical waveguide 51 is maximized, so that the laser light are more efficiently introduced into the near-field light generating layer 28.

On the other hand, in the near-field light generating layer 28, surface plasmons are excited over the entire depth direction. Then, more surface plasmons can be concentrated on the generating end part 28f because the near-field light generating part 28a is formed in the isosceles triangle with the generating end part 28f as a vertex, thereby causing the generating end part 28f to generate more intensive near-field light. Further, the optical waveguide 51 is opposed to the ridge part 28h via the interposed layer 31 having a very small thickness so that the lower face 51e is arranged very close to the generating end part 28f. Therefore, the laser light passing through the optical waveguide 51 can be used more efficiently for the generation of near-field light. The lower face 51e being a flat face makes the procedure of manufacturing the optical waveguide 51 simpler and also makes it possible to transmit the laser light more efficiently to the near-field light generating layer 28.

Further, the magnetic pole end part layer 41 is arranged closer to the ABS 101 than is the optical waveguide 51, and the magnetic pole end part layer 41 is opposed to the generating end part 28f via the interposed layer 31, similarly to the optical waveguide 51. More specifically, the optical waveguide 51 and the magnetic pole end part layer 41 are arranged at very close positions boundlessly close to the generating end part 28f generating the intensive near-field light while keeping the same minute distance with respect to the generating end part 28f. Therefore, a magnetic flux can be emitted from the magnetic pole end face 41a to a limited extremely small region (this region is a recording region where data will be recorded) in the magnetic recording medium to which the near-field light is applied from the generating end part 28f, so as to record data thereon. Thus, in the thermally assisted magnetic head 100, recording of data and heating can be highly efficiently performed on the extremely small recording region of the magnetic recording medium.

Further, the thermally assisted magnetic head 100 has a very close arrangement structure that the three elements of near-field light generating layer 28, main magnetic pole layer 40, and optical waveguide 51 are arranged very close to each other, in which when the near-field light generating layer 28 significantly generates heat, the near-field light generating layer 28 may project or melt. However, in the thermally assisted magnetic head 100, the above-described heat radiating layer 29 is formed on the side opposite to the main magnetic pole layer 40 and the optical waveguide 51 with the near-field light generating layer 28 in between in order to eliminate projection and melting of the near-field light generating layer 28 while keeping the aforementioned very close arrangement structure. As described above, in the thermally assisted magnetic head 100, the three elements of near-field light generating layer 28, main magnetic pole layer 40, and optical waveguide 51 are arranged in a most efficient positional relation for performing recording data and heating on the extremely small recording region of the magnetic recording medium.

On the other hand, the magnetic pole end face 41a opposed to the generating end part 28f is formed in the downward narrowing shape. Therefore, a magnetic flux can be intensively emitted from the magnetic pole end face 41a to the limited extremely small region of the magnetic recording medium where data will be recorded. In addition, the recording region can be intensively and surely heated by the near-field light generated from the generating end part 28f.

Further, a part of the laser light moving through the optical waveguide 51 are reflected by the main magnetic pole layer 40 to the interposed layer 31 and thereby introduced to the near-field light generating layer 28, thereby improving seepage of evanescent light at the interposed layer 31 to cause the near-field light generating layer 28 to excite more surface plasmons.

Moreover, the magnetic pole end part layer 41 and the yoke magnetic pole layer 42 constituting the main magnetic pole layer 40 are in contact with the lower front end face 51b, the upper front end face 51c, and the upper face 51d of the optical waveguide 51 as has been described. Therefore, a part of the laser light moving through the optical waveguide 51 can be reflected more efficiently.

Further, since the optical waveguide 51 and the near-field light generating layer 28 are arranged to be able to take in the light through the two side faces 28c, 28d into the near-field light generating layer 28, the near-field light generating layer 28 can efficiently take in evanescent light through the two side faces 28c, 28d and efficiently generate surface plasmons.

Method of Manufacturing Thermally Assisted Magnetic Head

A method of manufacturing the thermally assisted magnetic head 100 having the structure mentioned above will now be explained with reference to FIG. 8(A), (B) to FIG. 15(A), (B) together with FIG. 1 and FIG. 2 mentioned above.

Here, FIG. 8(A) to FIG. 15(A) are sectional views corresponding to FIG. 1 in the processes of manufacturing the thermally assisted magnetic head 100, and FIG. 8(B) to FIG. 15(B) are front views corresponding to FIG. 2 of the same. In the drawings, the left end face in (A) indicates a position (a planned opposing surface position) which will become the ABS 101 afterward.

First, the substrate 1 made of a ceramic material such as aluminum oxide-titanium carbide ($Al_2O_3.TiC$) is prepared. Subsequently, as shown in FIG. 8(A), (B), the insulating layer 2 made of an insulating material such as alumina ($Al_2O_3$), the lower shield layer 3 made of a magnetic material and the lower shield gap film 4 are successively laminated on the substrate 1.

Next, the upper shield gap film 6 is formed by an insulating material such as to shield the MR device 5. Here, an undepicted lead connected to the MR device 5 is formed, and the MR device 5 and lead are covered with the upper shield gap film 6. Thereafter, using a magnetic material, the upper shield layer 7 is formed on the upper shield gap film 6.

Then, on the upper shield layer 7, the insulating layer 8 is formed using an insulating material such as alumina ($Al_2O_3$) or the like. Thereafter, a portion of the insulating layer 8 which is located on the planned opposing surface position side is removed, and the connecting magnetic pole layer 21 is formed using a magnetic material such as CoNiFe, CoFe, NiFe, CoFeN or the like.

Then, as illustrated in FIG. 9(A), (B), an insulating layer 24 is formed on the whole surface of the laminated body using an insulating material such as alumina ($Al_2O_3$) or the like, and portions of the insulating layer 24 where the front magnetic pole layer 22 will be formed and the rear magnetic pole layer 23 will be formed are removed.

Then, the lower thin-film coil 10 is formed on the insulating layer 24 on the surface of the laminated body, for example, by the frame plating method. Subsequently, the front magnetic pole layer 22 and the rear magnetic pole layer 23 are formed at the open portions of the insulating layer 24, for example, by the frame plating method. Through the aforementioned processes, the state illustrated in FIG. 9(A), (B) can be yielded. Note that the order of forming the lower thin-film coil 10, the front magnetic pole layer 22 and the rear magnetic pole layer 23 may be changed so that the front magnetic pole layer 22 and the rear magnetic pole layer 23 are formed before the lower thin-film coil 10.

Figures 10A, 10B:
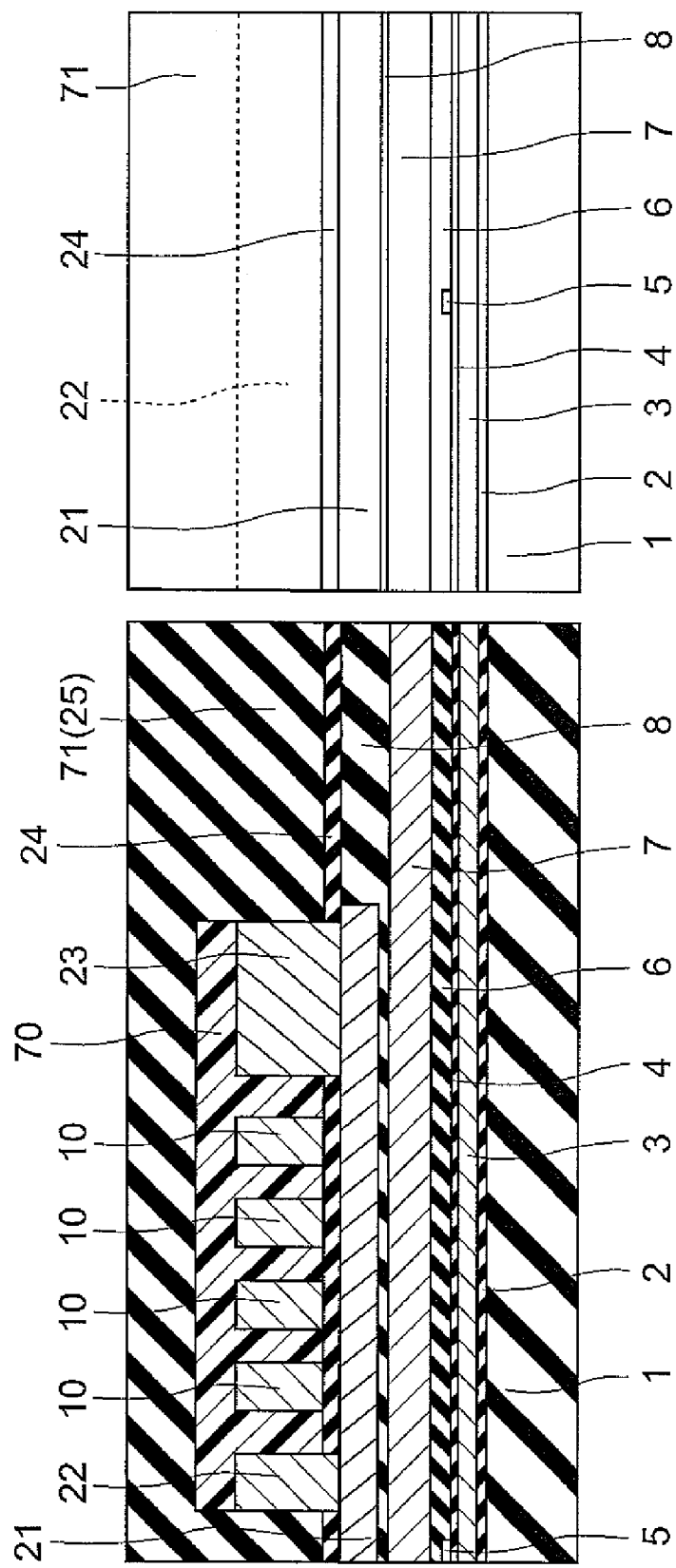
FIG. 10 is a sectional view illustrating a process subsequent to that in FIG. 9, in which (A) is a sectional view corresponding to FIG. 1, (B) is a sectional view corresponding to FIG. 2.

Next, as illustrate in FIG. 10(A), (B), a photoresist is applied to the surface of the laminated body, and patterning is then performed using a predetermined photomask to form a photoresist layer 70 covering the front magnetic pole layer 22, the rear magnetic pole layer 23, and the lower thin-film coil 10. Further, an insulating layer 71 which will become the insulating layer 25 is formed on the surface of the laminated body, using an insulating material such as alumina ($Al_2O_3$) or the like.

Figures 11A, 11B:
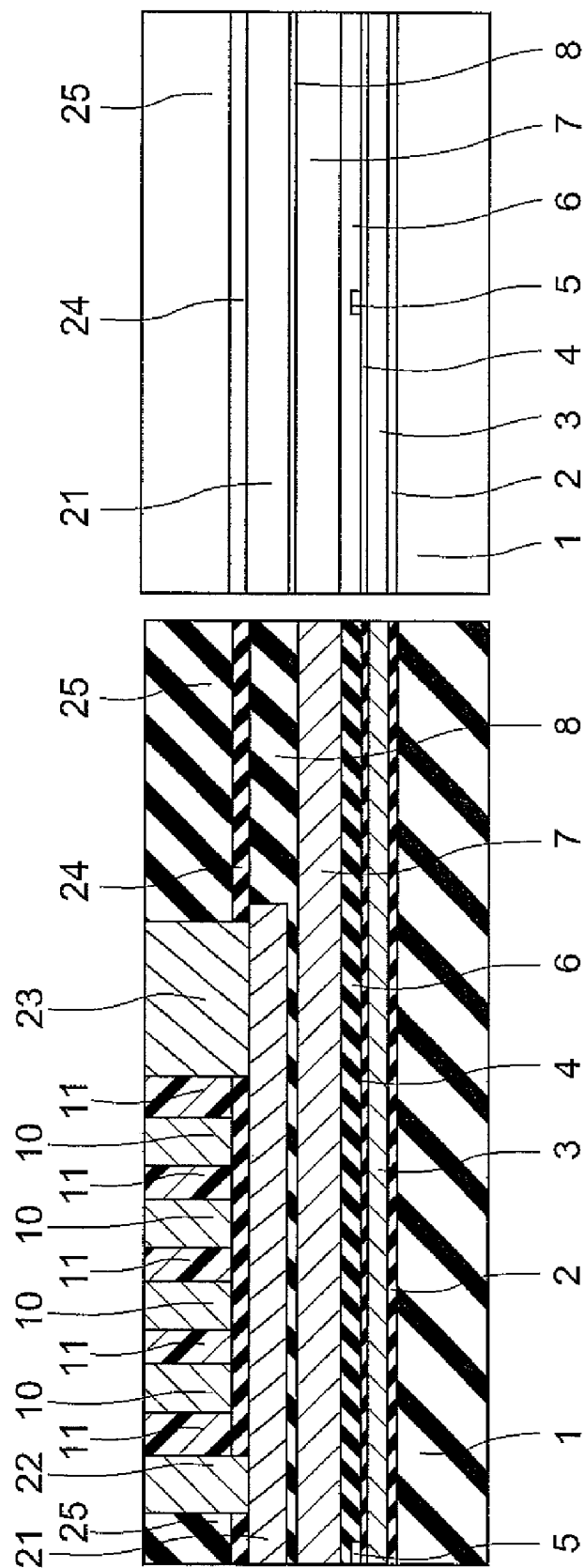
FIG. 11 is a sectional view illustrating a process subsequent to that in FIG. 10, in which (A) is a sectional view corresponding to FIG. 1, (B) is a sectional view corresponding to FIG. 2.

Thereafter, the surface of the laminated body is polished by chemical mechanical polishing (hereinafter referred to as "CMP"), for example, until the lower thin-film coil 10 emerges, so as to be made flat as shown in FIG. 11(A), (B). This yields a state where the lower thin-film coil 10 is insulated by the photoresist 11.

Figures 12A, 12B:
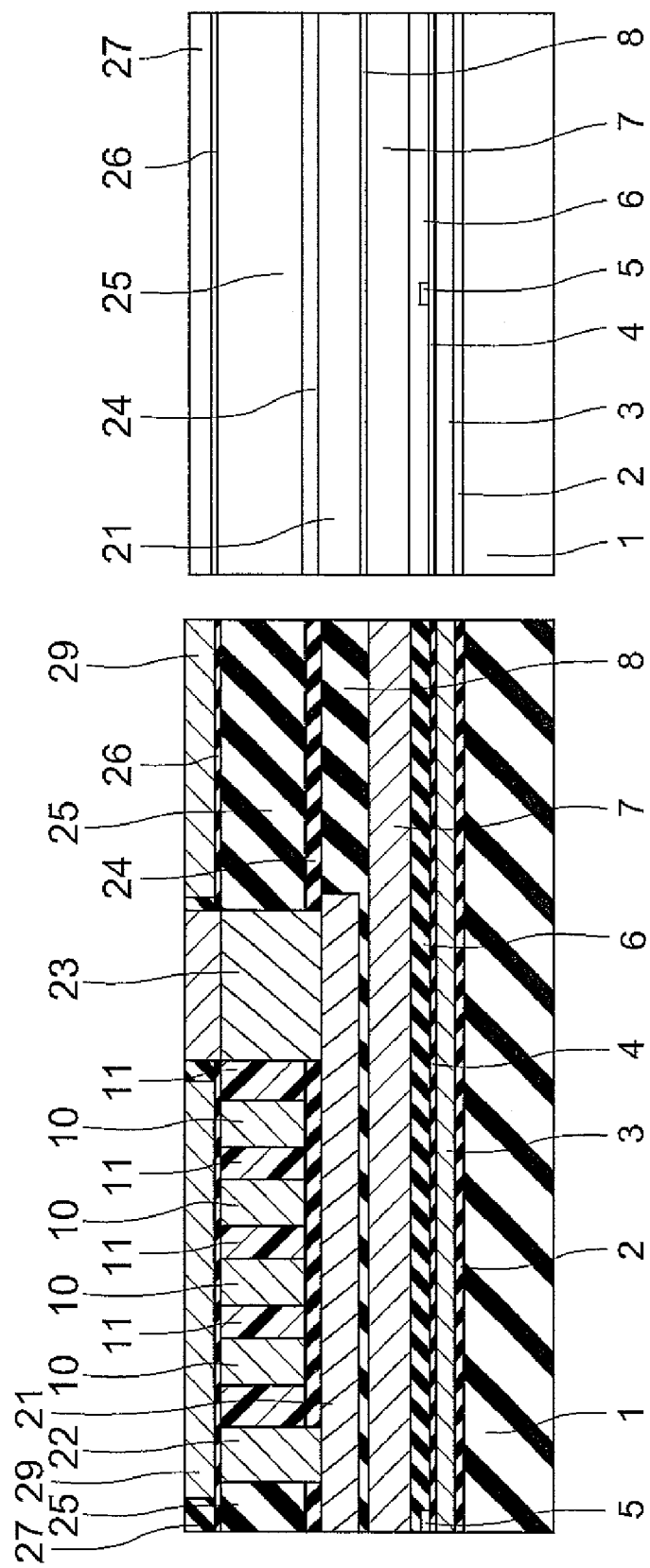
FIG. 12 is a sectional view illustrating a process subsequent to that in FIG. 11, in which (A) is a sectional view corresponding to FIG. 1, (B) is a sectional view corresponding to FIG. 2.

Subsequently, as shown in FIG. 12(A), (B), an interlayer insulating layer 26 is formed on the whole surface of the laminated body by insulating material such as alumina ($Al_2O_3$) or the like so as to cover a surface which the lower thin-film coil 10 is exposing. Next, a part of the interlayer insulating layer 26, under which the rear magnetic pole layer 23 is formed, is removed to form a magnetic layer to become the lower magnetic pole layer 45 later.

Then, the heat radiating layer 29 is formed using a non-magnetic material such as SiC or the like. In this event, the heat radiating layer 29 is formed in a rectangular plate shape having a size reaching a position more distant from the planned opposing surface position than is the turn part 10D. Further, the heat radiating layer 29 is formed to be backed away (distant) from the planned opposing surface position.

Further, an insulating layer is formed on the whole surface of the laminated body using an insulating material such as alumina ($Al_2O_3$) or the like, and the surface of the laminated body is polished, for example, by CMP until the heat radiating layer 29 emerges so as to make the surface of the laminated body flat. Thus, the protective insulating layer 27 can be formed such that a gap between the heat radiating layer 29 and the planned opposing surface position is filled with an insulating material 27a and a portion on the rear side of the heat radiating layer 29 is filled with an insulating material 27b (see FIG. 3 about the insulating materials 27a, 27b). Further, the lower magnetic pole layer 45 leading to the rear magnetic pole layer 23 is formed.

Then, as illustrated in FIG. 13(A), (B), a metal layer in a rod shape is formed, for example, by sputtering such that the generating end part is arranged at the planned opposing surface position and the bottom face thereof is in direct contact with the protective insulating layer 27 and the heat radiating layer 29. Then, for example, the ion beams etching or the like is used to shape the metal layer to thereby form the near-field light generating layer 28 in a triangle pole shape.

Next, the dielectric substance layer 30 is formed on the whole surface of the laminated body, for example, by the atomic layer deposition so that the surrounding of the near-field light generating layer 28 is filled with the dielectric substance layer 30. Then, the interposed layer 31 is formed on the whole surface of the laminated body using a dielectric substance such as alumina or the like, for example, by the atomic layer deposition.

Thereafter, the main magnetic pole layer 40, the optical waveguide 51, and the upper magnetic pole layer 46 of the linking magnetic pole layer 47 are formed as follows.

First, as illustrated in FIG. 14(A), (B), a dielectric substance layer is formed using a dielectric substance such as $Ta_2O_5$ or the like transmitting the laser light, a portion of the dielectric Substance layer which is located on the planned opposing surface position side is removed to form the optical waveguide 51. In this event, the optical waveguide 51 is formed to be connected, via the interposed layer 31, to a pole-shaped portion of the near-field light generating layer 28 which is distant from the planned opposing surface position.

Subsequently, the insulating layer 32 is formed on the planned opposing surface position side of the optical waveguide 51, using an insulating material such as alumina ($Al_2O_3$) or the like. Then, a recessed portion according to the shape of the magnetic pole end face 41a is formed in the insulating layer 32 in a manner to be opposed to the generating end part 28f of the near-field light generating layer 28. Then, the magnetic pole end part layer 41 is formed in the recessed portion of the insulating layer 32 such that the magnetic pole end face 41a is arranged at the planned opposing surface position, by the sputtering using a magnetic material such as CoNiFe, CoFe, NiFe or the like, while the upper magnetic pole layer 46 connected to the lower magnetic pole layer 45 is formed. In this event, the magnetic pole end face 41a is formed to be opposed to the generating end part 28f.

Figures 15A, 15B:
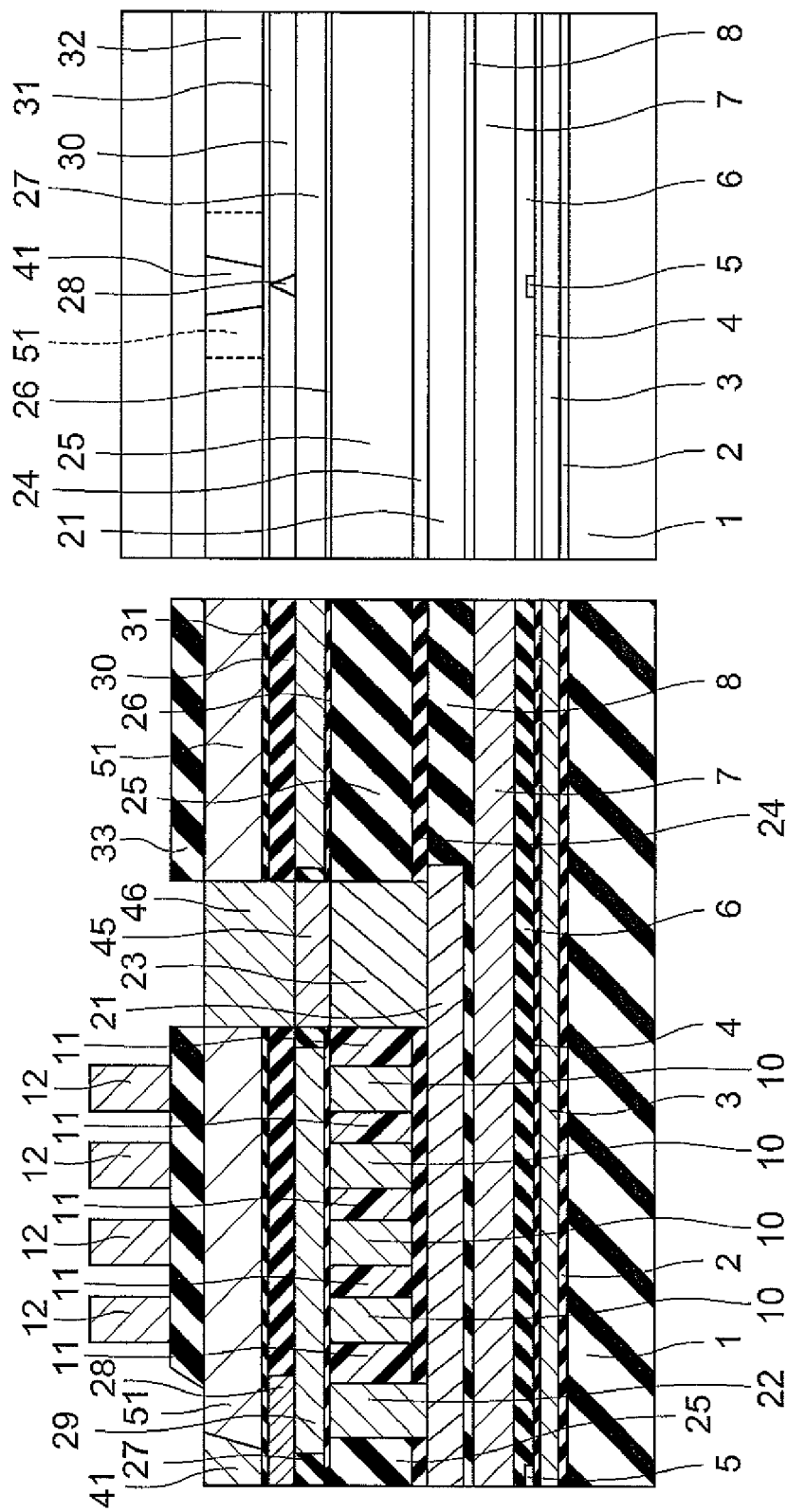

Next, as illustrated in FIG. 15(A), (B), an insulating layer 33 (having a thickness of about 1.2 m) is formed on the whole surface of the laminated body using an insulating material such as alumina ($Al_2O_3$) or the like, and a portion of the insulating layer 33 which is located on the planned opposing surface position side and a portion of the insulating layer 33 under which the upper magnetic pole layer 46 is formed are removed. Thereafter, the upper thin-film coil 12 is formed on the insulating layer 33, for example, by the frame plating method.

Subsequently, photoresist is applied to the surface of the laminated body and patterned using a predetermined photomask to form the photoresist layer 13 covering the upper thin-film coil 12. Then, the yoke magnetic pole layer 42 is formed using a magnetic material such as CoNiFe, CoFe, NiFe or the like such that the front magnetic pole layer 42d is arranged at the planned opposing surface position and the yoke magnetic pole layer 42 is connected to the upper magnetic pole layer 46 straddling the upper thin-film coil 12. Thus, the main magnetic pole layer 40 is formed. Further, after an overcoat layer 34 made of an insulating material such as alumina ($Al_2O_3$) or the like is formed on the whole surface of the laminated body, the thermally assisted magnetic head 100 is manufactured.

Modified Example

In the above-described thermally assisted magnetic head 100, a near-field light generating layer 88 illustrated in FIG.

Figure 20:
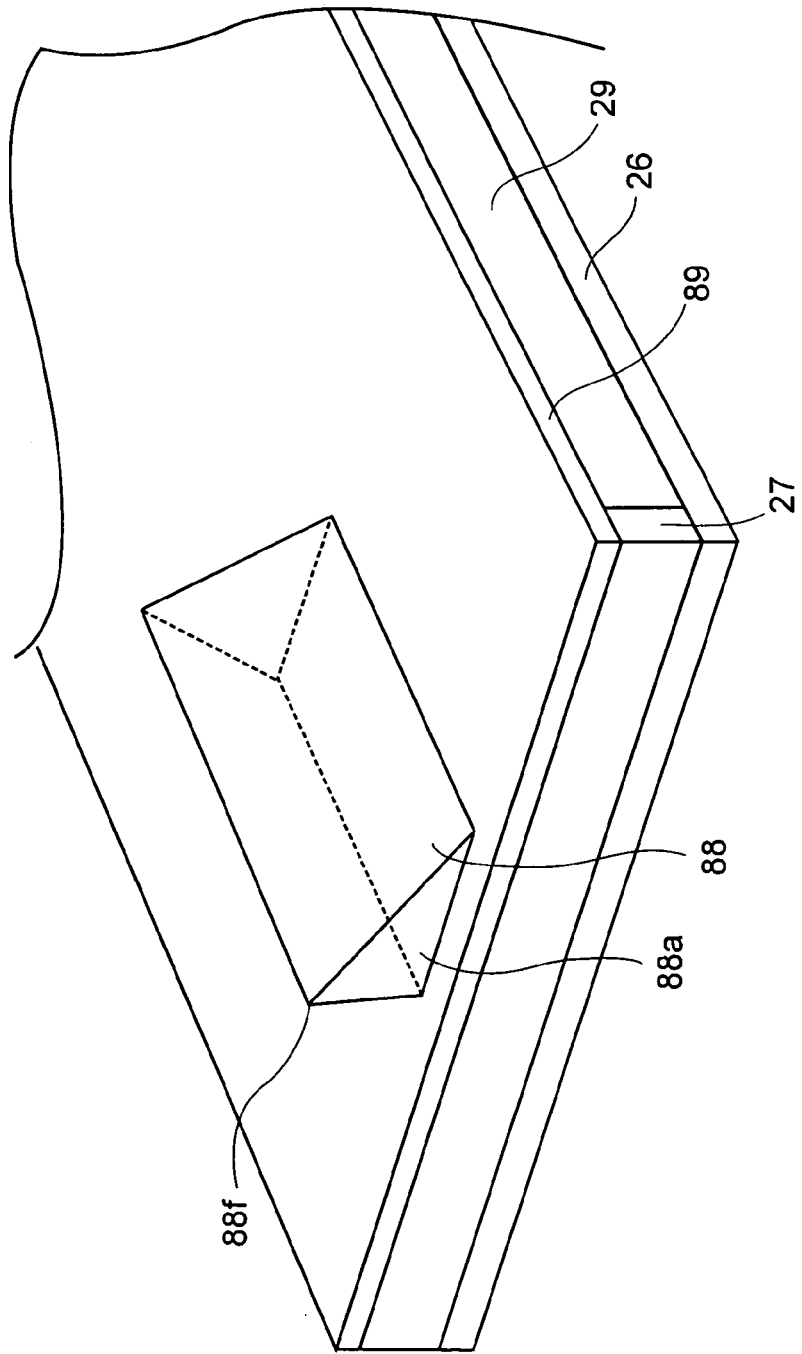
FIG. 20 is a perspective view illustrating a near-field light generating layer together with a protective insulating layer and a heat radiating layer according to a modified example.

20 may be formed in place of the near-field light generating layer 28. Here, FIG. 20 is a perspective view illustrating the near-field light generating layer 88 together with the protective insulating layer 27, the heat radiating layer 29, and an intermediate layer 89.

The near-field light generating layer 88 is different from the near-field light generating layer 28 in that the shape of a near-field light generating part 88a is different and that the near-field light generating layer 88 is in contact with the heat radiating layer 29 via the intermediate layer 89, and is the same as the near-field light generating layer 28 in other points.

The near-field light generating part 28a is formed in an isosceles triangle in which the whole near-field light generating part 28a including the generating end part 28f is arranged within the ABS 101. In contrast, in the near-field light generating part 88a, only a generating end part 88f is arranged within the ABS 101. In other words, in the near-field light generating part 88a, the portion other than the generating end part 88f is arranged on the rear side (at a backed away position) of the ABS 101. Also in such a near-field light generating layer 88, near-field light can be generated from the generating end part 88f as in the near-field light generating layer 28. The intermediate layer 89 is formed of a dielectric substance such as alumina or the like. With such a structure, the heat of the near-field light generating layer 88 can be conducted to the heat radiating layer 29 and radiated therefrom, thereby preventing projection of the near-field light generating layer 88 due to its own expansion and preventing failure of the hard disk drive. Further, melting of the generating end part 88f can also be prevented.

Figure 21B:
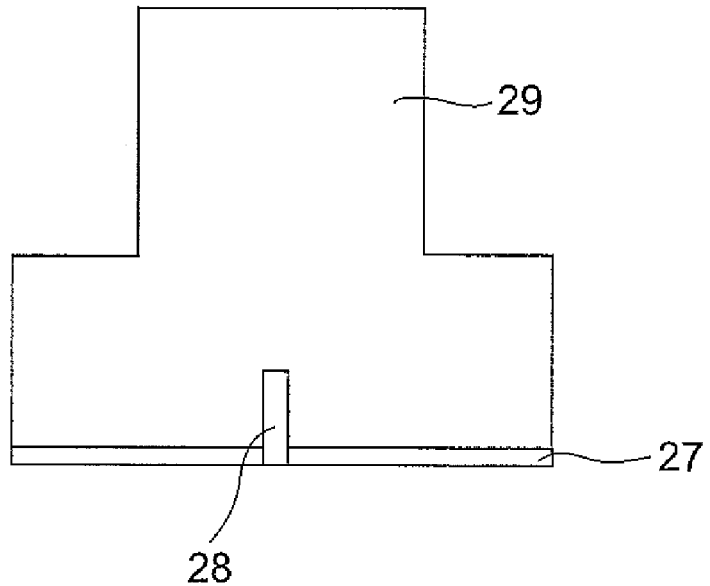

Further, the above-described heat radiating layer 29 is formed with a uniform width over the entire depth direction as illustrated in FIG. 21(A). The heat radiating layer 29 only needs to be formed wider than the near-field light generating layer 28 over the entire depth direction and does not always need to have a uniform width over the entire depth direction such that a portion thereof on the rear face side is formed with a smaller width as illustrate in FIG. 21(B).

Embodiments of Head Gimbal Assembly and Hard Disk Drive

Figure 17:
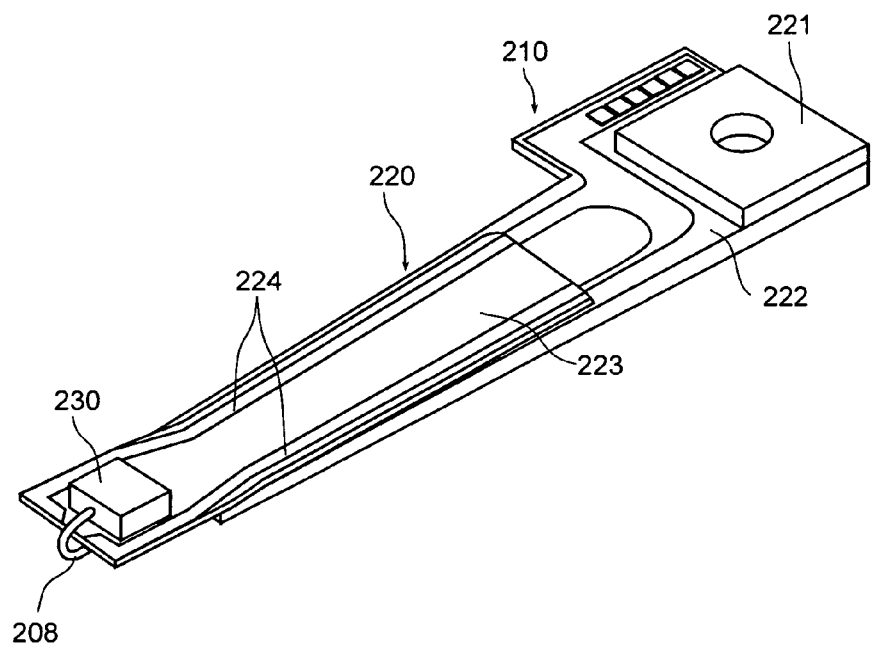
FIG. 17 is a perspective view illustrating a rear side of HGA.

Embodiments of the head gimbal assembly and hard disk drive will now be explained with reference to FIG. 16, FIG. 17, FIG. 18.

FIG. 16 is a perspective view showing a hard disk drive 201 equipped with the above-mentioned thermally assisted magnetic head 100. The hard disk drive 201 includes a hard disk (magnetic recording medium) 202 rotating at a high speed and a head gimbal assembly (HGA) 210. The hard disk drive 201 is an apparatus which actuates the HGA 210, so as to record/reproduce data onto/from recording surfaces of the hard disk 202. The hard disk 202 has a plurality of (4 in the drawing) platters. Each platter has a recording surface opposing its corresponding thermally assisted magnetic head 100.

The hard disk drive 201 positions a slider 230 on a track by an assembly carriage device 203. Further, the hard disk drive 201 has a plurality of drive arms 209. The drive arms pivot about a pivot bearing shaft 206 by means of a voice coil motor (VCM) 205, and are stacked in a direction along the pivot bearing shaft 206. Further, an HGA 210 is attached to the tip of each drive arm.

Further, the hard disk drive 201 has a semiconductor laser 207 generating laser light for heating, a control circuit 204 controlling recording/reproducing and the generation of light by the semiconductor laser 207, and an optical fiber 208 guiding the laser light to the slider 230.

The HGA 210 will now be described with reference to FIG. 17. FIG. 17 is a perspective view illustrating a rear face side of the HGA 210. In the HGA 210, the slider 230 is fixed to a tip portion of a suspension 220. Further, in the HGA 210, one end portion of a wiring member 224 is electrically connected to a terminal electrode of the slider 230.

The suspension 220 has a load beam 222, a base plate 221 provided at a base portion of the load beam 222, a flexure 223 fixed to and supported on the load beam 222 from the tip end side to the front side of the base plate 221 and having elasticity, and the wiring member 224. The wiring member 224 has a lead conductor and connection pads electrically connected to both ends of the lead conductor.

The slider 230 will now be described with reference to FIG. 18. FIG. 18 is a perspective view illustrating the slider 230. The slider 230 has a slider base plate 231 having the ABS 101 and a device formation part 233, and an output end part of the optical fiber 208 is inserted into the slider 230. Further, the thermally assisted magnetic head 100 is formed at the ABS 101 of the device formation part 233.

In the hard disk drive 201, when the HGA 210 is rotated, the slider 230 moves in a radial direction of the hard disk 202, i.e., a direction traversing track lines.

The aforementioned HGA 210 and hard disk drive 201 have the thermally assisted magnetic head 100, and thus have a structure capable of preventing failure caused by projection of the near-field light generating layer 28 from the ABS 101 and preventing melting of the near-field light generating layer 28.

Though the above-mentioned embodiments explain a type in which a thin-film coil is wound like a flat spiral about the linking magnetic pole layer or the main magnetic pole layer by way of example, the present invention is also applicable to a type in which the thin-film coil is wound about the main magnetic pole layer.

What is claimed is:

1. A thermally assisted magnetic head comprising a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, wherein the near-field light generating layer has a near-field light generating part in a triangle shape with the generating end part being one vertex, and is formed in a triangle pole shape extending from the medium-opposing surface in a depth direction intersecting with the medium-opposing surface, wherein the optical waveguide is formed to be opposed to a ridge part of the near-field light generating layer via an interposed layer, the ridge part extending from the generating end part in the depth direction, wherein the magnetic pole end face of the main magnetic pole layer is formed to be opposed to the generating end part via the interposed layer, on a side closer to the medium-opposing surface than is the optical waveguide, and wherein the thermally assisted magnetic head comprises a heat radiating layer in contact with an opposite side of the near-field light generating layer from the optical waveguide.

2. A thermally assisted magnetic head according to claim 1, wherein the heat radiating layer is arranged at a position distant from the medium-opposing surface, and wherein the thermally assisted magnetic head further comprises a protective insulating layer arranged between the heat radiating layer and the medium-opposing surface.

3. A thermally assisted magnetic head according to claim 1, wherein the heat radiating layer is formed wider than the near-field light generating layer over the entire depth direction.

4. A thermally assisted magnetic head according to claim 1, wherein the near-field light generating part is formed in an isosceles triangle with two sides connected to the generating end part having equal lengths and a bottom side part opposing the generating end part being arranged on a side of the heat radiating layer.

5. A thermally assisted magnetic head according to claim 4, wherein the ridge part of the near-field light generating layer is formed along a direction orthogonal to the medium-opposing surface.

6. A thermally assisted magnetic head according to claim 1, wherein the main magnetic pole layer has a magnetic pole end part layer including the magnetic pole end face, and the magnetic pole end part layer is in contact with a front end face of the optical waveguide which is located along the medium-opposing surface.

7. A thermally assisted magnetic head according to claim 6, wherein the main magnetic pole layer has a yoke magnetic pole layer in contact with an opposed region of an upper face of the optical waveguide which is opposed to the ridge part, the upper face being located on a side distant from the near-field light generating layer, and the yoke magnetic pole layer is junctioned to the magnetic pole end part layer.

8. A thermally assisted magnetic head according to claim 6, wherein the magnetic pole end face is formed in a downward narrowing shape with a width gradually getting smaller as approaching to the generating end part.

9. A thermally assisted magnetic head according to claim 6, wherein the magnetic pole end part layer has a symmetrical structure formed to be bilaterally symmetrical about a portion of the magnetic pole end part layer opposed to the generating end part.

10. A thermally assisted magnetic head according to claim 7, wherein the magnetic pole end part layer and the yoke magnetic pole layer have a symmetrical structure formed to be bilaterally symmetrical about portions of the magnetic pole end part layer and the yoke magnetic pole layer opposed to the generating end part.

11. A thermally assisted magnetic head according to claim 1, further comprising:
a return magnetic pole layer having a magnetic pole end face arranged within the medium-opposing surface;
a linking magnetic pole layer magnetically linking the main magnetic pole layer to the return magnetic pole layer; and
a thin-film coil wound about one of the main magnetic pole layer, the return magnetic pole layer, and the linking magnetic pole layer,
wherein the heat radiating layer is arranged between the near-field light generating layer and the thin-film coil and is in contact with the thin-film coil via an interlayer insulating layer.

12. A thermally assisted magnetic head according to claim 1, wherein the optical waveguide is formed along a direction orthogonal to the medium-opposing surface.

13. A thermally assisted magnetic head according to claim 1, wherein a lower face of the optical waveguide opposed to the ridge part via the interposed layer is a flat face.

14. A thermally assisted magnetic head according to claim 11, wherein assuming that a portion of the thin film coil arranged at a position most distant from the medium-opposing surface is a most distant conductive part, the heat radiating layer is formed in a rectangular plate shape having a size reaching a position more distant from the medium-opposing surface than is the most distant conductive part.

15. A thermally assisted magnetic head according to claim 2, wherein the heat radiating layer is formed using a non-magnetic material higher in thermal conductivity and lower in coefficient of thermal expansion than the protective insulating layer.

16. A thermally assisted magnetic head according to claim 2, wherein the protective insulating layer is formed using an insulating material lower in hardness than the heat radiating layer.

17. A head gimbal assembly comprising a slider having a thermally assisted magnetic head formed thereon,
the thermally assisted magnetic head comprising a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer,
wherein the near-field light generating layer has a near-field light generating part in a triangle shape with the generating end part being one vertex, and is formed in a triangle pole shape extending from the medium-opposing surface in a depth direction intersecting with the medium-opposing surface,
wherein the optical waveguide is formed to be opposed to a ridge part of the near-field light generating layer via an interposed layer, the ridge part extending from the generating end part in the depth direction,
wherein the magnetic pole end face of the main magnetic pole layer is formed to be opposed to the generating end part via the interposed layer, on a side closer to the medium-opposing surface than is the optical waveguide, and
wherein the thermally assisted magnetic head comprises a heat radiating layer in contact with an opposite side of the near-field light generating layer from the optical waveguide.

18. A hard disk drive comprising a head gimbal assembly having a thermally assisted magnetic head, and a magnetic recording medium opposing the thermally assisted magnetic head,
the thermally assisted magnetic head comprising a main magnetic pole layer having a magnetic pole end face arranged within a medium-opposing surface opposing the magnetic recording medium; a near-field light generating layer having a generating end part arranged within the medium-opposing surface, the generating end part generating near-field light for heating the magnetic recording medium; and an optical waveguide guiding light to the near-field light generating layer,
wherein the near-field light generating layer has a near-field light generating part in a triangle shape with the generating end part being one vertex, and is formed in a triangle pole shape extending from the medium-opposing surface in a depth direction intersecting with the medium-opposing surface, wherein the optical waveguide is formed to be opposed to a ridge part of the near-field light generating layer via an interposed layer, the ridge part extending from the generating end part in the depth direction, wherein the magnetic pole end face of the main magnetic pole layer is formed to be opposed to the generating end part via the interposed layer, on a side closer to the medium-opposing surface than is the optical waveguide, and wherein the thermally assisted magnetic head comprises a heat radiating layer in contact with an opposite side of the near-field light generating layer from the optical waveguide.

* * * * *